(12) United States Patent  
Chan

(10) Patent No.: US 8,635,251 B1
(45) Date of Patent: Jan. 21, 2014

(54) SEARCH AND COMPUTING ENGINE

(76) Inventor: Paul Sui-Yuen Chan, Vallejo, CA (US)

( * ) Notice: Subject to any disclaimer, the term of this patent is extended or adjusted under 35 U.S.C. 154(b) by 853 days.

(21) Appl. No.: 12/128,268

(22) Filed: May 28, 2008

Related U.S. Application Data

(60) Provisional application No. 60/946,984, filed on Jun. 29, 2007.

(51) Int. Cl.
*G06F 7/00* (2006.01)
(52) U.S. Cl.
USPC ............ 707/803; 707/667; 707/711; 707/741
(58) Field of Classification Search
None
See application file for complete search history.

(56) References Cited

U.S. PATENT DOCUMENTS

| | | | | |
|---|---|---|---|---|
| 5,832,268 | A * | 11/1998 | Anderson et al. | 719/316 |
| 6,121,969 | A * | 9/2000 | Jain et al. | 715/850 |
| 6,212,518 | B1 * | 4/2001 | Yoshida et al. | 1/1 |
| 2003/0007014 | A1 * | 1/2003 | Suppan et al. | 345/853 |
| 2003/0069871 | A1 * | 4/2003 | Yucel | 706/60 |
| 2003/0118021 | A1 * | 6/2003 | Donoghue et al. | 370/392 |
| 2003/0177140 | A1 * | 9/2003 | Debard et al. | 707/104.1 |
| 2003/0182274 | A1 * | 9/2003 | Oh | 707/3 |
| 2004/0133543 | A1 * | 7/2004 | Shlaes et al. | 707/1 |
| 2004/0133581 | A1 * | 7/2004 | Shinjo | 707/100 |
| 2004/0221238 | A1 * | 11/2004 | Cifra et al. | 715/762 |
| 2005/0091287 | A1 * | 4/2005 | Sedlar | 707/200 |
| 2005/0097514 | A1 * | 5/2005 | Nuss | 717/114 |
| 2006/0149719 | A1 * | 7/2006 | Harris | 707/3 |
| 2006/0168183 | A1 * | 7/2006 | Fuller et al. | 709/223 |
| 2006/0271527 | A1 * | 11/2006 | Kutsumi et al. | 707/3 |
| 2006/0282437 | A1 * | 12/2006 | Balasubramanian | 707/100 |
| 2007/0130116 | A1 * | 6/2007 | Cras et al. | 707/2 |
| 2008/0167858 | A1 * | 7/2008 | Christie et al. | 704/10 |

* cited by examiner

*Primary Examiner* — Mohammad S Rostami

(57) ABSTRACT

A system and method to program computers directly from a Web Browser, by cascading sets of retrieval, computation and update requirement specifications to facilitate repetition, decision and execution control logics, without using query, procedural and programming languages. This method provides database product independent Web based access of databases on the Internet with the following capabilities: creating a database dictionary/directory for describing existing or new databases, tables, columns, and data values; creating new databases; searching the directory by keywords to establish entry points to the directory; browsing the directory upward or downward by the user from the entry points to identify information of interest; creating retrieval, computation and update requirement specifications during the directory browsing process; saving, restoring the requirement specifications by name and submitting the requirement specifications to be executed by the computing engine; cascading previously saved requirement specifications as components and sub-components to create newly named requirement specification which can itself be saved or executed.

14 Claims, 36 Drawing Sheets

Directory Home

Home | Search | Scan | Select | Set | New | Drop | Build | Print | Reset | Review | Save | Restore | Execute | Logout

Inspect the links below:

- Customer_Information
- Financial_Information
- Human_Resources
- Order_Information
- Product_Information
- Supplier_Information
- Sales_Forcast

FIG. 2

Financial_Information

Home | Search | Scan | Select | Set | New | Drop | Build | Print | Reset | Review | Save | Restore | Execute | Logout

Inspect the links below:

- Six_Month_Projection
- Seven_Year_Plan
- Expense_Allocation
- Financial_Statement
- Loan_Payment
- Investments
- Break_Even_Analysis

FIG. 3

Order_Table

Home | Search | Scan | Select | Set | New | Drop | Build | Print | Reset | Review | Save | Restore | Execute | Logout This Table is described as: Order information

| Select | Position | Order by | Group by | Column Name | Low Limit | High Limit |
|---|---|---|---|---|---|---|
| ☐ | xxx | xxx | xxx | All | xxxxxxxxx | xxxxxxxxx |
| ☐ | ▸ | ▸ | ▸ | OrderID | | |
| ☐ | ▸ | ▸ | ▸ | CustomerID | ▸ | ▸ |
| ☐ | ▸ | ▸ | ▸ | EmployeeID | ▸ | ▸ |
| ☐ | ▸ | ▸ | ▸ | OrderDate | ▸ | ▸ |
| ☐ | ▸ | ▸ | ▸ | OrderYear | ▸ | ▸ |
| ☐ | ▸ | ▸ | ▸ | RequiredDate | ▸ | ▸ |
| ☐ | ▸ | ▸ | ▸ | RequiredYear | ▸ | ▸ |
| ☐ | ▸ | ▸ | ▸ | ShipperDate | ▸ | ▸ |
| ☐ | ▸ | ▸ | ▸ | ShipperYear | ▸ | ▸ |
| ☐ | ▸ | ▸ | ▸ | ShipperID | ▸ | ▸ |
| ☐ | ▸ | ▸ | ▸ | Freight | ▸ | ▸ |
| ☐ | ▸ | ▸ | ▸ | ShipName | | |
| ☐ | xxx | xxx | xxx | AddressInfo | xxxxxxxxx | xxxxxxxxx |
| ☐ | ▸ | ▸ | ▸ | ShippedQuarter | | ▸ |

FIG. 4A

| Include | Exclude | Insert | Replace | Add | Delete | Report | Make |
|---|---|---|---|---|---|---|---|
| Column | | Position | | Formula | | | |
| Row | | Group | | Formula | | | |
| Compute | Define | Total | Average | Count | Maximum | Minimum | |

FIG. 4B

Order_Table

Home | Search | Scan | Select | Set | New | Drop | Build | Print | Reset | Review | Save | Restore | Execute | Logout This Column Group is described as: Address information Show unique rows only: ☐  Descending sort order: ☐  Maximum rows: 2000

| Select | Position | Order by | Group by | Column Name | Low Limit | High Limit |
|---|---|---|---|---|---|---|
| ☐ | xxx | xxx | xxx | All | | |
| ☐ | | | | Address | xxxxxxxx | xxxxxxxx |
| ☐ | | | | City | | |
| ☐ | | | | Regions | | |
| ☐ | | | | PostalCode | | |
| ☐ | | | | Country | | |

Include | Exclude | Insert | Replace | Add | Delete | Report | Make

| Column | Position | | Formula |
|---|---|---|---|
| Row | Group | | Formula |

Compute | Define | Total | Average | Count | Maximum | Minimum

FIG. 5A

Customer_Table

Home | Search | Scan | Select | Set | New | Drop | Build | Print | Reset | Review | Save | Restore | Execute | Logout This Table is described as: Customer information Show unique rows only: ☐  Descending sort order: ☐  Maximum rows: 2000

| Select | Position | Order by | Group by | Column Name | Low Limit | High Limit |
|---|---|---|---|---|---|---|
| ☐ | xxx | xxx | xxx | All | | |
| ☐ | xxx | ▸ | ▸ | CustomerID | xxxxxxxxx | xxxxxxxxx |
| ☐ | xxx | ▸ | ▸ | CompanyName | | |
| ☐ | xxx | ▸ | ▸ | ContactName | | |
| ☐ | xxx | xxx | xxx | Title | | |
| ☐ | xxx | ▸ | ▸ | AddressInfo | xxxxxxxxx | xxxxxxxxx |
| ☐ | xxx | ▸ | ▸ | PhoneNumber | | |
| ☐ | xxx | ▸ | ▸ | Fax | | |

Include | Exclude | Insert | Replace | Add | Delete | Report | Make

| Column | Position | Formula |
|---|---|---|
| Row | Group | Formula |

Compute | Define | Total | Average | Count | Maximum | Minimum

FIG. 5B

Housing_Forcast

Home | Search | Scan | Select | Set | New | Drop | Build | Print | Reset | Review | Save | Restore | Execute | Logout This Table is described as:Housing information Show unique rows only: ☐ Descending sort order: ☐ Maximum rows: 2000

| Select | Position | Order by | Group by | Column Name | Low Limit | High Limit |
|--------|----------|----------|----------|-------------|-----------|------------|
| ☐ | xxx | xxx | xxx | All | xxxxxxxxx | xxxxxxxxx |
| ☐ | ▸ | ▸ | ▸ | MSA | | |
| ☐ | ▸ | ▸ | ▸ | State | | |
| ☐ | ▸ | ▸ | ▸ | 2004_Housing | ▸ | ▸ |
| ☐ | ▸ | ▸ | ▸ | 2003_Housing | ▸ | ▸ |
| ☐ | ▸ | ▸ | ▸ | 2002_Housing | ▸ | ▸ |
| ☐ | ▸ | ▸ | ▸ | 2001_Housing | ▸ | ▸ |
| ☐ | ▸ | ▸ | ▸ | 2000_Housing | ▸ | ▸ |

Include | Exclude | Insert | Replace | Add | Delete | Report | Make

| Column | Position | Formula |
|--------|----------|---------|
| Row | Group | Formula |

Compute | Define | Total | Average | Count | Maximum | Minimum

FIG. 6A

MSA

Home | Search | Scan | Select | Set | New | Drop | Build | Print | Reset | Review | Save | Restore | Execute | Logout

This column is described as: Metro statistical areas

The format of this column is: VALUE_GROUP(11)

| Select | Position | Row Value |
|--------|----------|-----------|
| ☐ | xxx | All |
| ☐ | ▼ | Alabama |
| ☐ | ▼ | Alaska |
| ☐ | ▼ | Arizona |
| ☐ | ▼ | Arkansas |
| ☐ | ▼ | California |
| ☐ | ▼ | Colorado |
| ☐ | ▼ | Connecticut |
| ☐ | ▼ | Delaware |
| ☐ | ▼ | Florida |
| ☐ | ▼ | Georgia |
| ☐ | ▼ | Hawaii |
| ☐ | ▼ | Idaho |
| ☐ | ▼ | Illinois |
| ☐ | ▼ | Indiana |
| ☐ | ▼ | Iowa |
| ☐ | ▼ | Kansas |
| ☐ | ▼ | Kentucky |
| ☐ | ▼ | Louisiana |
| ☐ | ▼ | Maryland |

FIG. 6B

MSA - Colorado

Home | Search | Scan | Select | Set | New | Drop | Build | Print | Reset | Review | Save | Restore | Execute | Logout

| Select | Position | Row Value |
|---|---|---|
| ☐ | xxx | All |
| ☐ | ▶ | BOULDER-LONGMONT_CO |
| ☐ | ▶ | COLORADO_SPRINGS_CO |
| ☐ | ▶ | DENVER_CO |
| ☐ | ▶ | FORT_COLLINS-LOVELAND_CO |
| ☐ | ▶ | GRAND_JUNCTION_CO |
| ☐ | ▶ | GREELEY_CO |
| ☐ | ▶ | PUEBLO_CO |

| Include | Exclude | Insert | Replace | Add | Delete | Report | Make |
|---|---|---|---|---|---|---|---|

| Column | Position | | Formula |
|---|---|---|---|
| Row | Group | | Formula |

| Compute | Define | Total | Average | Count | Maximum | Minimum |
|---|---|---|---|---|---|---|

FIG. 6C

Scan key: Ca

Home | Search | Scan | Select | Set | New | Drop | Build | Print | Reset | Review | Save | Restore | Execute | Logout

This is the result of scanning Ca, click link to search:

- Alameda_dos_Canàrios,_891
- Alejandra_Camino
- Av._Inês_de_Castro,_414
- Cactus_Comidas_para_llevar
- California
- Calle_del_Rosal_4
- Calle_Dr._Jorge_Cash_321
- Camembert_Pierrot
- Campinas
- Canada
- CapitalizationRate
- Caracas
- Carine_Schmitt
- Carlos_Diaz
- Carlos_González
- Carlos_Hernández
- Carnarvon_Tigers
- Carrera_22_con_Ave._Carlos_Soublette_#8-35
- Carrera_52_con_Ave._Bolívar_#65-98_Llano_Largo
- CategoryDescription

FIG. 7A

Search: California

Home | Search | Scan | Select | Set | New | Drop | Build | Print | Reset | Review | Save | Restore | Execute | Logout

Inspect the links below:

- California->MSA->Employment_Forcast->Sales_Forcast->Home

- California->MSA->Housing_Forcast->Sales_Forcast->Home

- California->West->State_Regions->Actual_Table->Sales_Forcast->Home

- California->West->State_Regions->Forcast_Table->Sales_Forcast->Home

FIG. 7B

New_Database

Home | Search | Scan | Select | Set | New | Drop | Build | Print | Reset | Review | Save | Restore | Execute | Logout

Define New Table or Database Inspect the links below:

- Database_Tables
- Table_Columns
- Column_Values
- Enumerate_Values

FIG. 8A

Database_Tables

Home | Search | Scan | Select | Set | New | Drop | Build | Print | Reset | Review | Save | Restore | Execute | Logout

| Select | Position | Order by | Group by | Column Name | Low Limit | High Limit |
|---|---|---|---|---|---|---|
| ☐ | xxx | xxx | xxx | All | xxxxxxxxx | xxxxxxxxx |
| ☐ | | | | DatabaseName | | |
| ☐ | | | | DatabaseMember | | |
| ☐ | | | | LineNumber | | |
| ☐ | | | | Description | | |
| ☐ | | | | DbProductUsed | | |
| ☐ | | | | GroupType | | |
| ☐ | | | | RealName | | |
| ☐ | | | | MemberURL | | |

Include | Exclude | Insert | Replace | Add | Delete | Report | Make

| Column | Position | | Formula |
|---|---|---|---|
| Row | Group | | Formula |

Compute | Define | Total | Average | Count | Maximum | Minimum

FIG. 8B

Table_Columns

Home | Search | Scan | Select | Set | New | Drop | Build | Print | Reset | Review | Save | Restore | Execute | Logout

| Select | Position | Order by | Group by | Column Name | Low Limit | High |
|--------|----------|----------|----------|-------------|-----------|------|
| ☐ | xxx | xxx | xxx | All | xxxxxxxxxx | xxxxx |
| ☐ | ▼ | ▼ | ▼ | TableName | ▼ | |
| ☐ | ▼ | ▼ | ▼ | ColumnName | ▼ | |
| ☐ | ▼ | ▼ | ▼ | ColumnNo | ▼ | |
| ☐ | ▼ | ▼ | ▼ | Description | ▼ | |
| ☐ | ▼ | ▼ | ▼ | PrimaryKey | ▼ | |
| ☐ | ▼ | ▼ | ▼ | Indexed | ▼ | |
| ☐ | ▼ | ▼ | ▼ | DataType | ▼ | |
| ☐ | ▼ | ▼ | ▼ | Format | ▼ | |
| ☐ | ▼ | ▼ | ▼ | DecimalPlaces | ▼ | |
| ☐ | ▼ | ▼ | ▼ | FieldSize | ▼ | |
| ☐ | ▼ | ▼ | ▼ | DefaultValue | ▼ | |
| ☐ | ▼ | ▼ | ▼ | Required | ▼ | |
| ☐ | ▼ | ▼ | ▼ | Validation | ▼ | |
| ☐ | ▼ | ▼ | ▼ | AutoIncrement | ▼ | |
| ☐ | ▼ | ▼ | ▼ | EnumerateValues | ▼ | |
| ☐ | ▼ | ▼ | ▼ | RealName | ▼ | |

Include | Exclude | Insert | Replace | Add | Delete | Report | Make |

| Column | Position | Formula |
|--------|----------|---------|
|        |          |         |

| Row | Group | Formula |
|-----|-------|---------|
|     |       |         |

Compute | Define | Total | Average | Count | Maximum | Minimum

FIG. 8C

Database_Tables

Home | Search | Scan | Select | Set | New | Drop | Build | Print | Reset | Review | Save | Restore | Execute | Logout

| DatabaseName | DatabaseMember | LineNumber | Description | DbProductUsed | GroupType | RealName | MemberURL |
|---|---|---|---|---|---|---|---|
| Home | Customer_Information | 1 | Customer Information | MySQL | Tables | . | . |
| Home | Financial_Information | 2 | Financial Information | MySQL | Tables | . | . |
| Home | Human_Resources | 3 | Human Resources | MySQL | Tables | . | . |
| Home | Order_Information | 4 | Order Information | MySQL | Tables | . | . |
| Home | Product_Information | 5 | Production Information | MySQL | Tables | . | . |
| Home | Supplier_Information | 6 | Supplier Information | MySQL | Tables | . | . |
| Home | Sales_Forcast | 7 | Sales forcast | MySQL | Tables | . | . |
| Home | Spreadsheet | 8 | Spreadsheet applications | MySQL | Tables | . | . |

FIG. 8D

Enumerate_Values

Home | Search | Scan | Select | Set | New | Drop | Build | Print | Reset | Review | Save | Restore | Execute | Logout This Table is described as:Enumerated value groups of commonly used columns Show unique rows only: ☐ Descending sort order: ☐ Maximum rows: 2000

| Select | Position | Order by | Group by | Column Name | Low Limit | High Limit |
|---|---|---|---|---|---|---|
| ☐ | xxx | xxx | xxx | All | xxxxxxxxx | xxxxxxxxx |
| ☐ | | ▼ | ▼ | ValueGroup | ▼ | ▼ |
| ☐ | | ▼ | ▼ | ValueSubgroup | ▼ | ▼ |
| ☐ | | ▼ | ▼ | LineNumber | | |
| ☐ | | ▼ | ▼ | Description | | |
| ☐ | | ▼ | ▼ | EnumerateValues | | |

| Include | Exclude | Insert | Replace | Add | Delete | Report | Make |

| Column | Position | | Formula |
|---|---|---|---|
| Row | Group | | Formula |

| Compute | Define | Total | Average | Count | Maximum | Minimum |

FIG. 8F

Customer_Table

Home | Search | Scan | Select | Set | New | Drop | Build | Print | Reset | Review | Save | Restore | Execute | Logout

To add new entry, enter data below:

| Column Name | Column Value |
|---|---|
| CustomerID | |
| CompanyName | |
| ContactName | |
| Title | |
| Address | |
| City | |
| Regions | |
| PostalCode | |
| Country | |
| PhoneNumber | |
| Fax | |

Add

FIG. 9A

Customer_Table

Home | Search | Scan | Select | Set | New | Drop | Build | Print | Reset | Review | Save | Restore | Execute | Logout No replaced rows given, enter new data below:

| CustomerID | CompanyName | ContactName | Title | PhoneNumber |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Replace

FIG. 9B

Customer_Table

Home | Search | Scan | Select | Set | New | Drop | Build | Print | Reset | Review | Save | Restore | Execute | Logout This Table is described as: Customer information Show unique rows only: ☐  Descending sort order: ☐  Maximum rows: 2000

| Select | Position | Order by | Group by | Column Name | Low Limit | High Limit |
|---|---|---|---|---|---|---|
| ☐ | xxx | xxx | xxx | All | xxxxxxxxxx | xxxxxxxxxx |
| ▶ | | ▶ | ▶ | CustomerID | ALFKI ▶ | BSBEV ▶ |
| ▶ | | ▶ | ▶ | CompanyName | ▶ | ▶ |
| ☐ | | ▶ | ▶ | ContactName | ▶ | ▶ |
| ▶ | xxx | xxx | xxx | Title | Owner | |
| ▶ | | ▶ | ▶ | AddressInfo | xxxxxxxxxx | xxxxxxxxxx |
| ☐ | | ▶ | ▶ | PhoneNumber | ▶ | ▶ |
| ☐ | | ▶ | ▶ | Fax | ▶ | ▶ |

Include | Exclude | Insert | Replace | Add | Delete | Report | Make

| Column | Position | Formula |
|---|---|---|
| Row | Group | Formula |

Compute | Define | Total | Average | Count | Maximum | Minimum

FIG. 9C

Housing_Forcast

Home | Search | Scan | Select | Set | New | Drop | Build | Print | Reset | Review | Save | Restore | Execute | Logout This Table is described as:Housing information Show unique rows only: ☐ Descending sort order: ☐ Maximum rows: 2000

| Select | Position | Order by | Group by | Column Name | Low Limit | High Limit |
|---|---|---|---|---|---|---|
| ☐ | xxx | xxx | xxx | All | xxxxxxxxxx | xxxxxxxxxx |
| ☐ | ▼ | ▼ | ▼ | MSA | | |
| ☐ | ▼ | ▼ | ▼ | State | Alabama | |
| ☑ | ▼ | ▼ | ▼ | 2004_Housing | | |
| ☑ | ▼ | ▼ | ▼ | 2003_Housing | | |
| ☐ | ▼ | ▼ | ▼ | 2002_Housing | | |
| ☐ | ▼ | ▼ | ▼ | 2001_Housing | | |
| ☐ | ▼ | ▼ | ▼ | 2000_Housing | | |

Include | Exclude | Insert | Replace | Add | Delete | Report | Make

| Column | Position | Formula |
|---|---|---|
| Row | Group | Formula |

Compute | Define | Total | Average | Count | Maximum | Minimum

FIG. 9D

Housing_Forcast

Home | Search | Scan | Select | Set | New | Drop | Build | Print | Reset | Review | Save | Restore | Execute | Logout

| MSA | 2004_Housing | 2003_Housing | Total | 2002_Housing | 2001_Housing | Total |
|---|---|---|---|---|---|---|
| ANNISTON_AL | 0.31 | 1.71 | 2.02 | 2.74 | 3.89 | 6.63 |
| AUBURN-OPELIKA_AL | 2.59 | 4.31 | 6.90 | 4.10 | 4.32 | 8.42 |
| BIRMINGHAM_AL | 2.36 | 3.30 | 5.66 | 3.62 | 4.19 | 7.81 |
| DECATUR_AL | -0.37 | 1.32 | 0.95 | 2.06 | 2.54 | 4.60 |
| DOTHAN_AL | 3.79 | 2.75 | 6.54 | 2.76 | 3.05 | 5.81 |
| FLORENCE_AL | 0.88 | 1.52 | 2.40 | 1.61 | 2.60 | 4.21 |
| GADSDEN_AL | -0.44 | 1.96 | 1.52 | 3.22 | 3.96 | 7.18 |
| HUNTSVILLE_AL | 0.89 | 1.99 | 2.88 | 2.52 | 3.06 | 5.58 |
| MOBILE_AL | 1.72 | 2.69 | 4.41 | 2.81 | 3.45 | 6.26 |
| MONTGOMERY_AL | 1.71 | 1.99 | 3.70 | 2.07 | 3.04 | 5.11 |
| TUSCALOOSA_AL | 1.09 | 2.58 | 3.67 | 2.73 | 3.40 | 6.13 |
| Total Alabama | 14.53 | 26.12 | 40.65 | 30.24 | 37.50 | 67.74 |
| FLAGSTAFF_AZ-UT | 6.08 | 8.11 | 14.19 | 7.60 | 7.14 | 14.74 |
| PHOENIX-MESA_AZ | 3.61 | 5.03 | 8.64 | 5.13 | 5.40 | 10.53 |
| TUCSON_AZ | 3.56 | 6.06 | 9.62 | 6.22 | 6.39 | 12.61 |
| Total Arizona | 13.25 | 19.20 | 32.45 | 18.95 | 18.93 | 37.88 |

FIG. 10A

Housing_Forcast

Home | Search | Scan | Select | Set | New | Drop | Build | Print | Reset | Review | Save | Restore | Execute | Logout

| MSA | Total 2003/2004 | Total 2001/2002 |
|---|---|---|
| Total Alabama | 40.65 | 67.74 |
| Total Arizona | 32.45 | 37.88 |

FIG. 10B

Housing_Forcast

Home | Search | Scan | Select | Set | New | Drop | Build | Print | Reset | Review | Save | Restore | Execute | Logout

| MSA | 2004_Housing | 2003_Housing | Total | 2002_Housing | 2001_Housing | Total |
|---|---|---|---|---|---|---|
| Total(Alabama) | 14.53 | 26.12 | 40.65 | 30.24 | 37.50 | 67.74 |
| Total(Alaska) | 1.81 | 5.85 | 7.66 | 5.86 | 6.05 | 11.91 |
| Total(Arizona) | 13.25 | 19.20 | 32.45 | 18.95 | 18.93 | 37.88 |
| Total(Arkansas) | 7.28 | 14.37 | 21.65 | 15.51 | 18.26 | 33.77 |
| Total(California) | 178.62 | 265.17 | 443.79 | 282.35 | 279.83 | 562.18 |
| Total(Colorado) | 12.39 | 17.18 | 29.57 | 23.11 | 31.64 | 54.75 |
| Total(Connecticut) | 29.81 | 48.74 | 78.55 | 57.29 | 59.48 | 116.77 |
| Total(Florida) | 137.92 | 186.08 | 324.00 | 188.50 | 189.58 | 378.08 |
| Total(Georgia) | 20.21 | 25.30 | 45.51 | 27.35 | 31.00 | 58.35 |
| Total(Hawaii) | 7.84 | 10.68 | 18.52 | 9.84 | 9.06 | 18.90 |
| Total(Illinois) | 17.33 | 28.05 | 45.38 | 28.55 | 29.82 | 58.37 |
| Total(Indiana) | 10.09 | 26.57 | 36.66 | 28.03 | 33.08 | 61.11 |
| Total(Iowa) | 12.24 | 22.11 | 34.35 | 23.48 | 26.65 | 50.13 |
| Total(Kansas) | 7.39 | 10.67 | 18.06 | 11.30 | 12.57 | 23.87 |
| Total(Kentucky) | 5.10 | 7.65 | 12.75 | 8.97 | 10.15 | 19.12 |
| Total(Louisiana) | 16.00 | 27.50 | 43.50 | 31.09 | 34.60 | 65.69 |
| Total(Maine) | 11.24 | 21.19 | 32.43 | 24.16 | 24.47 | 48.63 |
| Total(Massachusetts) | 36.04 | 76.38 | 112.42 | 94.07 | 99.13 | 193.20 |
| Total(Michigan) | 12.09 | 26.81 | 38.90 | 30.57 | 35.42 | 65.99 |
| Total | 551.18 | 865.62 | 1416.80 | 939.22 | 987.22 | 1926.44 |

FIG. 10C

Stock_Investments

Home | Search | Scan | Select | Set | New | Drop | Build | Print | Reset | Review | Save | Restore | Execute | Logout This Table is described as: Stock investment information Show unique rows only: ☐ Descending sort order: ☐ Maximum rows: 2000

| Select | Position | Order by | Group by | Column Name | Low Limit | High Limit |
|--------|----------|----------|----------|-------------|-----------|------------|
| ☐ | xxx | xxx | xxx | All | | |
| ☐ | ▶ | ▶ | ▶ | Stock | xxxxxxxxxx | xxxxxxxxxx |
| ☐ | ▶ | ▶ | ▶ | Symbol | ▶ | ▶ |
| ☐ | ▶ | ▶ | ▶ | DateAcquired | ▶ | ▶ |
| ☐ | ▶ | ▶ | ▶ | Shares | ▶ | ▶ |
| ☐ | ▶ | ▶ | ▶ | InitialPrice | ▶ | ▶ |
| ☐ | ▶ | ▶ | ▶ | CurrentPrice | ▶ | ▶ |

Include | Exclude | Insert | Replace | Add | Delete | Report | Make

| Column | Position | Formula |
|--------|----------|---------|
| Percent_Gain | | 100*(CurrentPrice-InitialPrice)/InitialPrice |
| Row | Group | Formula |
| | | |

Compute | Define | Total | Average | Count | Maximum | Minimum

FIG. 11A

Stock_Investments

Home | Search | Scan | Select | Set | New | Drop | Build | Print | Reset | Review | Save | Restore | Execute | Logout

| Select | Position | Order by | Group by | Column Name | Low Limit | High Limit |
|---|---|---|---|---|---|---|
| ☐ | xxx | xxx | xxx | All | xxxxxxxxx | xxxxxxxxx |
| ☐ | ▸ | ▸ | ▸ | Stock | | |
| ☐ | ▸ | ▸ | ▸ | Symbol | AA ▸ | XOM ▸ |
| ☐ | ▸ | ▸ | ▸ | DateAcquired | ▸ | |
| ☐ | ▸ | ▸ | ▸ | Shares | | |
| ☐ | ▸ | ▸ | ▸ | InitialPrice | ▸ | ▸ |
| ☐ | ▸ | ▸ | ▸ | CurrentPrice | ▸ | ▸ |
| ☐ | ▸ | ▸ | ▸ | InitialCost | | |
| ☐ | ▸ | ▸ | ▸ | CurrentValue | | |
| ☐ | ▸ | ▸ | ▸ | Gain_Loss | | |
| ☑ | ▸ | ▸ | ▸ | Percent_Gain | | |

| Include | Exclude | Insert | Replace | Add | Delete | Report | Make |
|---|---|---|---|---|---|---|---|

| Column | Position | Formula |
|---|---|---|
| Row | Group | Formula |
| Total | 2 | SUM(Gain_Loss)/SUM(InitialCost)*100 |

| Compute | Define | Total | Average | Count | Maximum | Minimum |
|---|---|---|---|---|---|---|

FIG. 11B

Stock_Investments

Home | Search | Scan | Select | Relate | Set | New | Drop | Build | Print | Reset | Review | Save | Restore | Execute | Logout

| Stock | Symbol | DateAcquired | Shares | InitialPrice | InitialCost | CurrentPrice | CurrentValue | Gain_Loss | Percent_Gain |
|---|---|---|---|---|---|---|---|---|---|
| Wal-Mart | WMT | 12/21/1998 | 187 | 154.32 | 28857.84 | 43.34 | 8104.58 | -20753.26 | -71.92 |
| Merck | MRK | 12/23/1997 | 887 | 36.67 | 32526.29 | 88.91 | 78863.17 | 46336.88 | 142.46 |
| IntlPaper | IP | 11/17/1996 | 323 | 47.35 | 15294.05 | 25.72 | 8307.56 | -6986.49 | -45.68 |
| Exxon | XOM | 03/03/1999 | 725 | 52.50 | 38062.50 | 79.98 | 57985.50 | 19923.00 | 52.34 |
| Citigroup | C | 10/11/1997 | 859 | 12.83 | 11020.97 | 50.76 | 43602.84 | 32581.87 | 295.64 |
| Boeing | BA | 09/02/1996 | 945 | 35.13 | 33197.85 | 62.32 | 58892.40 | 25694.55 | 77.40 |
| Alcoa | AA | 01/03/2001 | 650 | 41.52 | 26988.00 | 29.71 | 19311.50 | -7676.50 | -28.44 |
| WaltDisney | DIS | 07/12/1999 | 667 | 18.55 | 12372.85 | 33.54 | 22371.18 | 9998.33 | 80.81 |
| Total | . | . | . | . | 198320.35 | . | 297438.73 | 99118.38 | 49.98 |
| .. | . | . | . | . | . | . | . | . | . |
| Average | . | . | 655.38 | 49.86 | 24790.04 | 51.78 | 37179.84 | 12389.80 | . |
| Highest | . | . | 945 | 154.32 | 38062.50 | 88.91 | 78863.17 | 46336.88 | 295.64 |
| Lowest | . | . | 187 | 12.83 | 11020.97 | 25.72 | 8104.58 | -20753.26 | -71.92 |

FIG. 11C

Plan_Table

Home | Search | Scan | Select | Set | New | Drop | Build | Print | Reset | Review | Save | Restore | Execute | Logout

| Select | Position | Order by | Group by | Column Name | Low Limit | High Limit |
|---|---|---|---|---|---|---|
| ☐ | xxx | xxx | xxx | All | xxxxxxxxxx | xxxxxxxxxx |
| ☐ | | | | RowNumber | | |
| ☑ | | | | RowName | | |
| ☐ | | | | Year2003 | | |
| ☐ | | | | Year2004 | | |
| ☐ | | | | Year2005 | | |
| ☐ | | | | Year2006 | | |
| ☐ | | | | Year2007 | | |
| ☐ | | | | Year2008 | | |
| ☐ | | | | Year2009 | | |

Include | Exclude | Insert | Replace | Add | Delete | Report | Make

| Column | Position | Formula |
|---|---|---|
| Row | Group | Formula |
| Revenue | 1 | Parameters.Sales_2002*(Parameters.Unit_cost/(1-Parameters.Margin)) |

Compute | Define | Total | Average | Count | Maximum | Minimum

FIG. 12A

Plan_Table

Home | Search | Scan | Select | Set | New | Drop | Build | Print | Reset | Review | Save | Restore | Execute | Logout

| Select | Position | Order by | Group by | Column Name | Low Limit | High Limit |
|---|---|---|---|---|---|---|
| | xxx | xxx | xxx | All | xxxxxxxxxx | xxxxxxxxxx |
| ☐ | | | | RowNumber | | |
| ☐ | | | | RowName | | |
| ☐ | | | | Year2003 | | |
| ☑ | | | | Year2004 | | |
| ☑ | | | | Year2005 | | |
| ☑ | | | | Year2006 | | |
| ☑ | | | | Year2007 | | |
| ☑ | | | | Year2008 | | |
| ☑ | | | | Year2009 | | |

Include | Exclude | Insert | Replace | Add | Delete | Report | Make

| Column | | Formula |
|---|---|---|
| Position | | |

| Row | | Formula |
|---|---|---|
| Group | 1 | |
| Revenue | | Revenue.#-1*(1+Parameters.Sales_growth)*(1-Parameters.Price_decrease) |

Compute | Define | Total | Average | Count | Maximum | Minimum

FIG. 12B

Plan_Table Parameters

Home | Search | Scan | Select | Relate | Set | New | Drop | Build | Print | Reset | Review | Save | Restore | Execute | Logout

| RowName | Year2003 | Year2004 | Year2005 | Year2006 | Year2007 | Year2008 | Year2009 |
|---|---|---|---|---|---|---|---|
| Revenue | 115915585.83 | 115625796.87 | 115336732.38 | 115048390.55 | 114760769.57 | 114473867.65 | 114187682.98 |
| Cost_of_goods | 69549351.50 | 69375478.12 | 69202039.43 | 69029034.33 | 68856461.74 | 68684320.59 | 68512609.79 |
| Margin | 46366234.33 | 46250318.75 | 46134692.95 | 46019356.22 | 45904307.83 | 45789547.06 | 45675073.19 |
| .. | . | . | . | . | . | . | . |
| Advertising | 17388337.87 | 17344869.53 | 17301509.86 | 17258258.58 | 17215115.44 | 17172080.15 | 17129152.45 |
| Maintenance | 1950000 | 5287000 | 4150000 | 5150000 | 2551000 | 3155000 | 2965000 |
| Rent | 1800000 | 1980000.00 | 2178000.00 | 2395800.00 | 2635380.00 | 2898918.00 | 3188809.80 |
| Salaries | 20864805.45 | 20812643.44 | 20760611.83 | 20708710.30 | 20656938.52 | 20605296.18 | 20553782.94 |
| Supplies | 1738733.79 | 1734386.95 | 1730050.99 | 1725725.86 | 1721411.54 | 1717108.01 | 1712815.24 |
| Total_Expense | 43741877.11 | 47158899.92 | 46120172.67 | 47238494.74 | 44779845.50 | 45548402.34 | 45549560.43 |
| .. | . | . | . | . | . | . | . |
| Income Before Tax | 2624357.22 | -908581.17 | 14520.28 | -1219138.52 | 1124462.33 | 241144.72 | 125512.76 |
| Income_Tax | 1049742.89 | 0 | 5808.11 | 0 | 449784.93 | 96457.89 | 50205.11 |
| Net Income | 1574614.33 | -908581.17 | 8712.17 | -1219138.52 | 674677.40 | 144686.83 | 75307.66 |

FIG. 12C

Payroll_Table

Home | Search | Scan | Select | Set | New | Drop | Build | Print | Reset | Review | Save | Restore | Execute | Logout This Table is described as: Payroll data Show unique rows only: ☐  Descending sort order: ☐  Maximum rows: 2000

| Select | Position | Order by | Group by | Column Name | Low Limit | High Limit |
|--------|----------|----------|----------|-------------|-----------|------------|
| ☐ | xxx | xxx | xxx | All | xxxxxxxxx | xxxxxxxxx |
| ☐ | ▸ | ▸ | ▸ | Employee_ID | ▸ | ▸ |
| ☐ | ▸ | ▸ | ▸ | Employee_Name | ▸ | ▸ |
| ☐ | ▸ | ▸ | ▸ | Rate | ▸ | ▸ |
| ☐ | ▸ | ▸ | ▸ | Hours | ▸ | ▸ |
| ☐ | ▸ | ▸ | ▸ | Dependents | ▸ | ▸ |
| ☐ | ▸ | ▸ | ▸ | YTD_Social_Sec | ▸ | ▸ |

Include | Exclude | Insert | Replace | Add | Delete | Report | Make

| Column | Position | Formula |
| Row | Group | Formula |

Compute | Define | Total | Average | Count | Maximum | Minimum

FIG. 12D

Parameters

Home | Search | Scan | Select | Set | New | Build | Print | Reset | Review | Save | Restore | Execute | Logout Make selections below:

This Table is described as:Parameters used in seven years plan

Show unique rows only: ☐ Descending sort order: ☐ Maximum rows: 2000

| Select | Position | Order by | Group by | Column Name | Low Limit | High Limit |
|---|---|---|---|---|---|---|
| ☐ | xxx | xxx | xxx | All | xxxxxxxxxx | xxxxxxxxxx |
| ☐ | ▼ | ▼ | ▼ | Sales_2002 | ▼ | ▼ |
| ☐ | ▼ | ▼ | ▼ | Rent_2002 | ▼ | ▼ |
| ☐ | ▼ | ▼ | ▼ | Unit_cost | ▼ | ▼ |
| ☐ | ▼ | ▼ | ▼ | Sales_growth | ▼ | ▼ |
| ☐ | ▼ | ▼ | ▼ | Price_decrease | ▼ | ▼ |
| ☐ | ▼ | ▼ | ▼ | Margin | ▼ | ▼ |

[ Include ] [ Exclude ] [ Insert ] [ Replace ] [ Add ] [ Delete ] [ Report ] [ Make ]

| Column | Position | Formula |
|---|---|---|
|  |  |  |
| Row | Group | Formula |
|  |  |  |

[ Compute ] [ Define ] [ Total ] [ Average ] [ Count ] [ Maximum ] [ Minimum ]

FIG. 12E

Product_Table Order_Table Order_Detail_Table Customer_Table

Home | Search | Scan | Select | Set | New | Drop | Build | Print | Reset | Review | Save | Restore | Execute | Logout The tables have the following columns in common, please select the columns used to connect these tables:

| Select | Column |
|---|---|
| ☐ | Address |
| ☐ | City |
| ☐ | Country |
| ☑ | CustomerID |
| ☑ | OrderID |
| ☐ | PostalCode |
| ☑ | ProductID |
| ☐ | Quantity |
| ☐ | Regions |
| ☐ | UnitPrice |

= ▶ Join

FIG. 13A

Order_Detail_Table

Home | Search | Scan | Select | Set | New | Drop | Build | Print | Reset | Review | Save | Restore | Execute | Logout This Table is described as: Order details Show unique rows only: ☐   Descending sort order: ☐   Maximum rows: 2000

| Select | Position | Order by | Group by | Column Name | Low Limit | High Limit |
|---|---|---|---|---|---|---|
| ☐ | xxx | xxx | xxx | All | | |
| ☐ | ▸ | ▸ | ▸ | OrderID | | xxxxxxxxx |
| ☐ | ▸ | ▸ | ▸ | ProductID | ▸ | ▸ |
| ☐ | ▸ | ▸ | ▸ | UnitPrice | ▸ | ▸ |
| ☐ | ▸ | ▸ | ▸ | Quantity | ▸ | ▸ |
| ☐ | ▸ | ▸ | ▸ | Discount | ▸ | ▸ |
| ▸ | ▸ | ▸ | ▸ | ProductSales | | |

Include | Exclude | Insert | Replace | Add | Delete | Report | Make

| Column | Position | Formula |
|---|---|---|
| Row | Group | Formula |
| Median | | (MIN(ProductSales)+MAX(ProductSales))/2 |

Compute | Define | Total | Average | Count | Maximum | Minimum

FIG. 13B

Product_Table Order_Table Order_Detail_Table Customer_Table

Home | Search | Scan | Select | Relate | Set | New | Drop | Build | Print | Reset | Review | Save | Restore | Execute | Logout

| ProductName | OrderID | EmployeeID | OrderDate | OrderYear | ProductSales | CustomerID | CompanyName |
|---|---|---|---|---|---|---|---|
| Mascarpone | 18752 | 3 | 11 | 1997 | 457.50 | ANAT | Ann Helado Empareda |
| Tofu Curb | 18621 | 3 | 8 | 1997 | 114.75 | ANAT | Ann Helado Empareda |
| Total(ANAT) | . | . | . | . | 572.25 | . | . |
| Maximum | . | . | . | . | 457.50 | . | . |
| Median | . | . | . | . | 286.13 | . | . |
| Cabrales | 17525 | 4 | 5 | 1997 | 1056.56 | ANTO | Anton Taqueria |
| Geitosts | 17652 | 3 | 9 | 1997 | 84.15 | ANTO | Anton Taqueria |
| Gummibärchen | 17647 | 1 | 9 | 1997 | 1094.80 | ANTO | Anton Taqueria |
| Ipohe Coffee | 17517 | 7 | 4 | 1997 | 677.02 | ANTO | Anton Taqueria |
| Mutton | 17533 | 7 | 6 | 1997 | 555.00 | ANTO | Anton Taqueria |
| Total(ANTO) | . | . | . | . | 3467.53 | . | . |
| Maximum | . | . | . | . | 1094.80 | . | . |
| Median | . | . | . | . | 589.48 | . | . |
| . | . | . | . | . | . | . | . |
| Total | . | . | . | . | 4039.78 | . | . |
| Maximum | . | . | . | . | 1094.80 | . | . |
| Median | . | . | . | . | 589.48 | . | . |

FIG. 14

Reviewing: Order_Detail_Table

Home | Search | Scan | Select | Set | New | Drop | Build | Print | Reset | Review | Save | Restore | Execute | Logout The following columns have been selected:

You may undo or reset these columns and rows:

| Select | Position | Order by | Group by | Column | Column Definition |
|---|---|---|---|---|---|
| ☐ | 1 ▾ | | ▾ | Define (ProductSales) | ProductSales=(UnitPrice*Quantity*(1.0-Discount)/100.0)*100 |

| Select | Group | Order by | | Column | Row Defination |
|---|---|---|---|---|---|
| ☐ | 10 ▾ | ▾ | xxx | OrderID | Maximum=MAX(ProductSales) |
| ☐ | 10 ▾ | ▾ | xxx | OrderID | Median=(MIN(ProductSales)+MAX(ProductSales))/2 |

| Undo | Hide | Unhide | Set | Report |

FIG.15

SEARCH AND COMPUTING ENGINE

This application claims the benefit of U.S. Provisional Application No. 60/946,984, filed Jun. 29, 2007, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF INVENTION

The present invention relates to user interface and processing method for searching, selecting, accessing, integration, reorganization, manipulation, aggregation and computation of information stored in databases and/or spreadsheets on the Internet.

BACKGROUND OF THE INVENTION

The importance of interoperability between database and spreadsheet is well recognized by the software industry. Most systems solve this problem by providing sophisticate methods to transfer data and operations between databases and spreadsheets. That is not the approach being taken by this invention. A number of patents that address this problem have been granted. Relevant prior patents include:

Microsoft: Method for creating an embedded database in a spreadsheet, U.S. Pat. No. 7,155,665

IBM: Transforming a portion of a database into a custom spreadsheet, U.S. Pat. No. 6,988,242

Oracle: Performing spreadsheet-like calculations in a database system, U.S. Pat. No. 6,985,895

However, the first two patents do not provide a uniform concept of spreadsheet and database. Namely, DBMS (Database Management Systems) and spreadsheet are treated as two different applications. The Microsoft and IBM patent attempts to make a spreadsheet from information in a database so that the results can be used as a spreadsheet using their spreadsheet applications. The Oracle patent attempts to enhance their SQL with some spreadsheet like constructs. The result is a non-standard SQL query language, which can only be used with Oracle products by users with technical skill.

Internet search engines such as Google and Yahoo are some of the most innovative software inventions in recent years. However, all existing search engines are focusing on finding documents on the Internet. There is a need for a search engine that can be used to find contents of databases and spreadsheets as wells as documents and media images in various formats. One patent that address some aspects of this problem is:

Google: Information extraction from a database, U.S. Pat. No. 6,678,681

However, the subject of the Google patent is in the extraction of information from a database to build the search index. The subject of Search/Computing is in the search, access, and information processing methodology. These two inventions potentially can greatly compliment each other.

Relational database management systems and spreadsheet are both very remarkable inventions. But they were invented at different times and for different purpose, therefore the application user interfaces of these two systems are not compatible. Both products require extensive trainings before they can be used effectively. Furthermore, the user interfaces of different DBMS's are very much product specific. There is no easy way to combine information from different databases and spreadsheets into a single view. There is a need to integrate the results of the search into a single view from which both spreadsheet and database functions can be performed.

Even though the Internet has been around since the 1970's, explosive use of the Internet has not occurred until the Internet browser was invented. The power of the Internet browser user interface is not limited to browsing and searching of documents. It is, in fact, a general-purpose application user interface that can be used to implement different applications. A number of patents for using Internet browser to access and view contents of databases were granted. These include:

IBM: Method and system for utilizing a database as a service, U.S. Pat. No. 7,171,420

Sybase: Development system providing HTML database control object U.S. Pat. No. 6,714,928

Inshift: Browser-based database-access engine apparatus and method, U.S. Pat. No. 6,460,041

These three patents provide some simple methods to access information in a database. None of them addresses the problems of search and access of multiple databases on the Internet and to perform computations with the integrated results of the search and access. While the usefulness of all these capabilities described in the prior art is well recognized, no existing invention has provided a solution that addresses all these problems in one system. Existing methods that address some aspects of these problems are significantly different from the approach being taken by this invention.

SUMMARY OF THE INVENTION

Search/Computing combines all the advantages of search engine, browser, database management and spreadsheet into a single system with a uniform user interface. Databases, spreadsheets and documents can be accessed and integrated from different information sources on the Internet and manipulated in one view (or one table). The user interface of Search/Computing allows non-technical users to search, select, access, integrate, reorganize, manipulate, aggregate and to perform computations without any knowledge of computer programming languages, database query languages and spreadsheet methods.

There are two effective methods for searching information in a book. The first method is top-down, also known as directory search. The second method is bottom-up, also known as index search. Search/Computing allows both methods to be used. From top-down, a directory/dictionary is used to organize a hierarchy of databases. Each database may contain a hierarchy of tables; each table contains one or more hierarchies of columns and each column may contain a hierarchy of possible values. The Search/Computing browser interface allows users to transverse from the root to the bottom of the hierarchy, making selections or computing instructions of columns and rows along the way. After the user finish transversal of one or more tables or databases, the data can be accessed and integrated according to the selections and computing instructions. This is a very simple method of accessing data from multiple data sources on the Internet.

The bottom up method allows a user to search information with keywords. Search/Computing keywords can be scanned alpha-numerically with a fragment of the keyword. There is a big difference between the Search/Computing and other keyword search methods. The Search/Computing method not only can be used to find what keyword is in which database, table, spreadsheet or document, but can also trace the entire path leading from the relevant objects to the root of the Search/Computing directory. This path tracing and database searching capability is a significant improvement to existing keyword search methods. A keyword may be the name of a table column, a table, or a database. It may also be a data values stored in tables of databases or spreadsheets. If the database contains documents, keywords may be significant words in the documents. If a keyword belongs to more than one path, the result of a search will show all the paths leading from the relevant objects to the root of the directory. Transversal of the directory/dictionary may start from the root of the directory/dictionary or from any item on a search path.

All the keywords in a directory/dictionary can be exported to an Internet search engine. Internet searching now consists of two steps. The first step is to locate one or more directories that contain the keywords. After these directories are identified, the second step is to go inside the directories and search within each directory and access the data as described before. Search/Computing, when used in conjunction with an Internet search engine such as Google or Yahoo provides a very powerful universal and local searching/access capability. The Search/Computing model is consistent with the existing search engine concept if each table in the directory/dictionary is consists of only a single document.

Spreadsheet provides some programming capability to non-technical user without any knowledge of computer programming language. However, it has many limitations. Spreadsheet cannot be used to store a large quantity of data and the capability to access multiple tables is very limited. While some spreadsheet products support limited data retrieval capabilities, it is no substitute for database functions. On the other hand, database functions do not provide formula replication and the computational capability of spreadsheet applications.

To combine the advantages of both systems, spreadsheets are created and stored as database tables by the Search/Computing engine. The Web browser interface is used to provide a common user interface for both spreadsheet and database applications. Information search, selection, access, manipulation, integration, reorganization, aggregation, formula definition and replication are provided by Search/Computing with a browser interface that is independent of any DBMS product. Formulas are defined in terms of symbolic names instead of column and row positions. This method of formula definition and replication is much easier than the traditional spreadsheet user interface. Furthermore, the formulas are not affected when the layout of the spreadsheet is changed. It can also be learned without extensive trainings.

What is patented in this invention is the system methodology and user interface to combine the capabilities of the search engine, the browser, the spreadsheet and the relational database into one concept and one system. There are many alternative implementations, screen displays and naming schemes possible. The implementations, illustrations and examples in this document are only used to help explain how the system works and not intended to be restrictions of this patent.

BRIEF DESCRIPTION OF THE DRAWINGS

FIG. 2 is a screen shot illustrating an example of the first level contents of a Search/Computing directory/dictionary.

FIG. 3 is a screen shot illustrating a hierarchy of tables and the top-down browsing of information in the Search/Computing directory/dictionary.

FIG. 4A and FIG. 4B is a screen shot illustrating a display of columns in a table of the Search/Computing directory/dictionary.

FIG. 5A is a screen shot illustrating a display of columns in a column group of a table in the Search/Computing directory/dictionary.

FIG. 5B is a screen shot illustrating a display of a common column group used by different tables.

FIG. 6A is a screen shot illustrating a display of columns in a table with groups and sub-groups of enumerated values in the Search/Computing directory/dictionary.

FIG. 6B is a screen shot illustrating a display of value subgroups in a table of a value group column in the Search/Computing directory/dictionary.

FIG. 6C is a screen shot illustrating a display of enumerated values in a value subgroup in the Search/Computing directory/dictionary.

FIG. 7A is a screen shot illustrating the results of the Scan command with a keyword fragment.

FIG. 7B is a screen shot illustrating the multiple path bottom-up search results of a keyword.

FIG. 8A is a screen shot showing the internal database tables of the Search/Computing directory/dictionary.

FIG. 8B is a screen shot showing the columns of the table Database_Tables of the Search/Computing internal database.

FIG. 8C is a screen shot showing the columns of the table Table_Columns of the Search/Computing internal database.

FIG. 8D is a screen shot illustrating an example of the contents of the internal database table Database_Tables.

FIG. 8F is a screen shot showing the columns of the table Enumerate_Values of the Search/Computing internal database.

FIG. 9A is a screen shot illustrating data entry using the Add Command.

FIG. 9B is a screen shot illustrating data entry of selected columns using the Replace Command.

FIG. 9C is a screen shot illustrating selections of columns and rows for viewing using the Include/Exclude Commands.

FIG. 9D is a screen shot illustrating selections of columns and rows for viewing and aggregations using the Include and Total Commands.

FIG. 10A is a screen shot illustrating the results of selections and aggregations of columns and rows for viewing using the Include and Total Commands.

FIG. 10B is a screen shot illustrating a condensed summary of columns and rows using the Total Commands.

FIG. 10C is a screen shot illustrating automatic aggregations of columns and rows using GROUP BY.

FIG. 11A is a screen shot illustrating the definition of a column formula.

FIG. 11B is a screen shot illustrating the definition of a row formula.

FIG. 11C is a screen shot illustrating a report created by using column and row formulas and aggregations.

FIG. 12A is a screen shot illustrating a spreadsheet application of a Seven Years Financial Plan.

FIG. 12B is a screen shot showing the definition of a row formula to illustrate reference of an adjacent cell in its calculation.

FIG. 12C is a screen shot illustrating the computed results of the Seven Years financial Plan.

FIG. 12D is a screen shot showing the columns of the Payroll Table to illustrate the use of functions.

FIG. 12E is a screen shot illustrating the use of a parameter table to store parameters for the Seven Years Financial Plan calculations.

FIG. 13A is a screen shot illustrating the specifications of JOIN conditions for accessing multiple tables.

FIG. 13B is a screen shot illustrating the definition of a row formula in a view consists of information from multiple tables.

FIG. 14 is a screen shot illustrating the results of accessing multiple tables using the JOIN operation.

FIG. 15 is a screen shot illustrating the review of selections, aggregations and formulas defined using the Review Command.

DETAILED DESCRIPTION OF THE PREFERRED EMBODIMENTS

Figure 1:
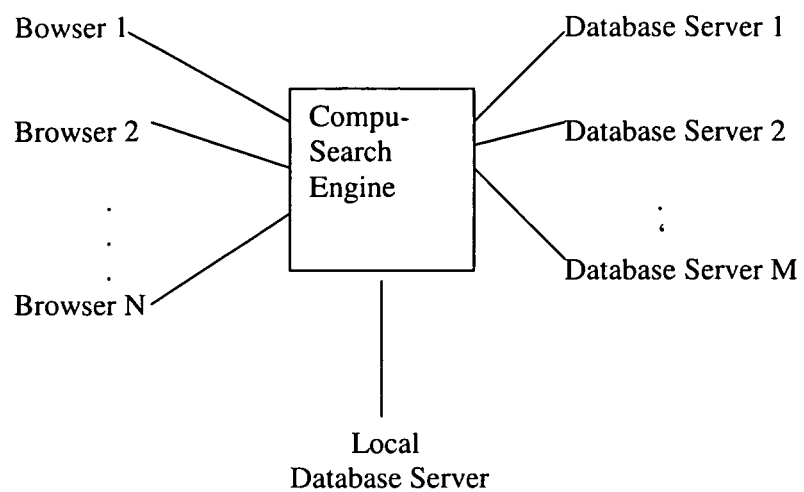
FIG. 1 describes the information flow and interactions between the Web browsers, the Search/Computing engine and the database servers.

The interaction and information flow between the Web browsers, the Search/Computing Engine and the database servers is shown in FIG. 1. The Search/Computing Engine is a Web application server that operates on a computer. End users of the Internet interact with the Search/Computing Engine using a Web browser running on desktop computers. The browsers, the Search/Computing Engine, and the database servers may all be operating on the same machine or on different machines on the Internet. Data are transferred between the Web browser and the Search/Computing Engine in Markup language (e.g. HyperText Markup Language HTML) commonly supported by Web browsers. Search/Computing accesses information from one or more relational database servers. Standard relational database management query language (e.g. Structured Query Language SQL) is used to access information from the database servers. HTML and SQL are used in all the discussions and examples of this embodiment.

There is no requirement that the DBMS product used by the database servers must be the same as long as they are capable of database query processing. Standard programming interface such as ODBC can be used, if supported by the database server. If not, product specific client interface is used. A local database server is needed to store the tables of the Search/Computing directory/dictionary. The local database is also used to handle data access from different database servers that are not interoperable. In this situation, the tables or parts of these tables from different database servers can be accessed and stored in the local database. The results are then produced by accessing the local database with SQL queries.

The center of this invention is a database directory/dictionary. In the directory/dictionary, databases may be organized into groups and subgroups of databases, forming a hierarchy of databases. Each database in the hierarchy may consist of one or more tables. Tables may also be organized into groups and sub-groups, forming a hierarchy of tables. A table is a two dimensional object consists of rows and columns. In the context of a relational database, a table is known as a relation and each element in the table is a data item. In the context of a spreadsheet, a table is a spreadsheet (or worksheet) and each element in the table is known as a cell. The Search/Computing data model allows table columns of a table be organized into groups and subgroups, forming a hierarchy of columns. The purpose of this organization is to make it easy for users to select groups of columns or to perform aggregations on groups of columns. Another advantage is that large number of columns can be organized and viewed by groups and sub-groups. Also, column groups and sub-groups can be defined once and used in multiple tables, making definition of tables much easier. The spreadsheet concept does not require a column to have a column type. In other words, all columns of a spreadsheet are text character strings. Each column of a relational database table must have a column type. A column type may be text character string, enumerated values, integer number, number with decimal places, time, date, currency, percentage, . . . etc. These data types are supported by Search/Computing. Search/Computing data type may also be 'document' with a document type extension (e.g. MS Word) and images with an image type extension. Hence, a table may contain an array of documents or images. Or it may contain only one document/image if the table has only one column and one row. To maintain consistency with the spreadsheet concept, the default data type of a table column is TEXT.

In a traditional spreadsheet, each row is identified by a row number and each column is identified by an alphabet. Formulas defined in a spreadsheet using this method to reference rows and columns are difficult to read and understand. Furthermore, if the layout of a spreadsheet is changed after a formula is defined, the formula must also be changed to reflect the position changes. Even though the use of alphabets for column names and numbers for row identification is perfectly acceptable by Search/Computing, a much better method of defining a spreadsheet is to name columns and rows with comprehensible symbolic names. The Search/Computing method allows rows and columns be referenced by symbolic names. Formulas can be defined in terms of column names and row labels (or row names). The formulas so defined are not only much easier to write and read, but also not affected by the changes in column and row positions. The first column (and/or other columns) of a table may be used to contain data that uniquely identify rows. The data type of this column can be TEXT or ENUM. The text string or enumerated values of this column are used as row labels (names). The Search/Computing directory/dictionary allows ENUM values to be organized as groups and subgroups forming a hierarchy of enumerated values. Again the purpose is to make it easier to view, reference and aggregate large groups of values.

This method of representing data tables can be used to represent multi-dimensional tables as well as conventional relational tables. Multi-dimensional databases can be represented in the directory/dictionary with each dimension represented as a column. The coordinates of each column are represented as enumerated values, which may be organized as a list of values or a value hierarchy. An N-dimensional table is represented as a table with N+1 columns because one additional column is needed to hold the data values of the multi-dimensional data cube.

Top-Down and Bottom-Up Searching

There are two commonly used methods to find information in a book or directory. The first method is top-down. The top-down method is analogous to finding information in the table of contents in a book. The alternative method is bottom-up by using keywords. This is analogous to looking up the page number of a book by looking at the subject index in the appendix of the book. Search/Computing supports both top-down and bottom-up search of its directory/dictionary with enhancements.

The Search/Computing top-down method allows users to start from the root of the directory/dictionary known as Home. From Home, one can look at the level one database or table groups organized by categories. From any one of the first level database or table groups, one can go down to the next level groupings of databases or tables. The database/table directory may have any number of levels depending on the complexity of the subject categories. The name of each category or sub-category is represented as a hyperlink on a Web browser page. One may drill down any directory path by clicking a link and the next level of sub-categories will be displayed together with a detail description of the link item. At any point, one may reverse the direction by going back to the previous browser page and transverse down a different path. FIG. 2 is an example of the Home directory of a management information database of a company. In this example, management information are organized by:

Customer_Information
    Financial_Information
    Human_Resources
    Order_Information
    Product_Information
    Supplier_Information
    Sales_Forcast By clicking the hyperlink Financial_Information on this page, one can look at the next level grouping of tables in this database as shown in FIG. 3. Under Financial_Information, the subgroups are:

Six_Month_Projection
    Seven_Year_Plan
    Expense_Allocation
    Financial_Statement
    Loan_Payment
    Investments
    Break_Even_Analysis Going into the Seven_Year_Plan subgroup, the next subgroups are:

Plan_Table
    Parameters

If at this point the user does not want to continue down this path, he can go back to the previous browser page and continue from that page. For example, one may go back to the page in FIG. 2 and transverse down the path Order_Information. The Order Information page in this example displays the sub-groups below:

Order_Table
    Order_Detail_Table
    Shipper_Table
    Quarterly_Order_Table
    Shipment_Table
    Constraints This process can continue until a link consists of a single table is reached. When this link on the browser page is clicked, the columns of this table will be displayed together with the detail description of the table. This browser page is known as the table column description page or the selection page. If the Order_Table link in this example is clicked, the table columns will be displayed as shown in FIG. 4A and FIG. 4B. FIG. 4B shows the bottom section of the selection page. It contains the Command Buttons and the formula definition facilities that can be applied. Search/Computing allows table columns be organized into groups and sub-groups as mentioned. Column groups are indicated by a series of x's on the line showing the name of the column group. In this example, the link AddressInfo is a group of columns. All other links under ColumnName on this browser page are single columns. When a link of a column group is clicked, it will display the column sub-groups and/or columns. In this example, addressInfo consists of the columns Address, City, Regions, PostalCode, Country will be displayed as shown in FIG. 5A. Search/Computing allows as many levels of column sub-groups as needed. A column group may be commonly used in different tables as mentioned. FIG. 5B shows that the column group AddressInfo is also in the Customer_Table.

If the link representing a single column is clicked, a detail description of the column, the data type, format and all other information about this column will be displayed. If the data type of the column is ENUM, the enumerated values of this column are also displayed. Enumerated values is a list all possible values of a column. In the situation where the list of enumerated values is very long, it is better to organize them in groups and sub-groups. The data type of columns with enumerated values so organized is designated as VALUE_GROUP. For example, the data type of the column MSA (Metro Statistic Areas) in FIG. 6A is VALUE_GROUP. There are hundreds of MSA in the country. Hence, MSA is better organized as a multi-levels hierarchy. The first level contains all the states of the country. The second level contains all the MSA in each state. When the column MSA of the table Employment_Forcast is clicked, all the states of the country will be displayed as shown in FIG. 6B. When a state on this page is clicked, the MSA in that state will be displayed as shown in FIG. 6C.

As one transverse the directory structure, columns and rows along the path, columns and rows can be selected for viewing, aggregations and/or calculations. The methods to perform these functions will be described later.

Search/Computing stores the hyperlinks of the directory structure in an index to support bottom-up searching by keywords. If one knows exactly which item he wants to view, he can use the Select Command on the Menu Bar to retrieve the item with its name. If he wants to browse the keywords in the index, he can use the Scan Command on the Menu Bar to view the keywords ordered alphabetically. The Scan Command prompts the user for a key value. If only a fragment of a key value is entered, the Scan Command will list all the keywords that match the fragment. For example, if the key value 'Ca' is entered, the Scan Command produces a list of keywords as shown in FIG. 7A.

This resulting list of keywords are hyperlinked. When one of these links is clicked, the Search Command is automatically invoked to search the directory/dictionary for all the items that contain this keyword. If the keyword is contained in more than one path in the directory, all the paths leading from the keyword to the root of the directory will be displayed. For example, if the link 'California' in FIG. 7A is clicked, the result in FIG. 7B displays four paths showing the columns, the tables and the databases in which 'California' is contained. Every element in the path is displayed as a hyperlink; any element can be viewed by clicking the corresponding link. Alternatively, one can enter a keyword in the Search Command prompt to produce the search paths. A keyword can be an enumerated value of a column, a column name, a table name, a database name or the name of a group or subgroup, and if the column type of a table column is TEXT, then keywords can be extracted from the data in this column and stored in the index. If the column type of a table column is DOCUMENT, then significant words in the documents of this column can also be extracted and put in the index.

Creation of the Compu-Search Directory/Dictionary

The Search/Computing directory/dictionary is constructed as an internal database. This internal database has four tables, namely, the Database_Tables, the Table_Columns, the Column_Values and the Enumerate_Values. New databases and/or tables are defined using the New Command on the Menu Bar. When the New Command is invoked, Search/Computing displays the four table names of this internal database as shown in FIG. 8A. The contents of these tables can be viewed and updated by clicking the corresponding link. The method for viewing and inputting information into this internal database is no different from other databases described in the directory/dictionary.

The table Database_Tables is used to store groups and subgroups of databases and tables. The columns defined in the database table are: DatabaseName, DatabaseMember, LineNumber, Description, DbProductUsed, GroupType, RealName, MemberURL as shown in FIG. 8B. There is one table row entry for each component/sub-component combination. The values of the column DatabaseName may be the name of a group or subgroup of databases or tables. It can also be 'Home' which refers to the root of the directory/dictionary. The values of the column DatabaseMember may be the names of a group or subgroup of databases or tables. It can also be the name of a single table. In this example, the home directory contains eight groups of tables as shown in FIG. 8D. The column LineNumber specifies the order of the Database-Member displayed on the Web page. The column Description provides a detail description of the DatabaseMember. The Column DbProductUsed specifies the DBMS product (e.g. Oracle, MySQL, Sybase) used to build the corresponding database or table. All tables in the same database must use the same DBMS product. The value in the column GroupType must be either 'Databases', 'Tables' or 'Table' for indication of a database group, a table group or a single table. The column RealName is meaningful for single table only. To avoid name conflicts of tables in different databases, it is not required that the name of a table in the Search/Computing directory/dictionary be the same as the name used in the target database. RealName is the actual table name used in the target database. If this column is empty, the real name is the same as the table name in the directory/dictionary. The real name is always used to access data from the database server. MemberURL specifies the network address of the database server where the DatabaseMember group of tables or databases is located. If it is empty, the database server is on the same machine as the Search/Computing engine.

The table Table_Columns is used to stored detail information about columns and column groups of each table. The definition of this table is shown in FIG. 8C. Each row of this table describes one table column or column group. Most columns in FIG. 8C are self-explanatory. TableName contains the name of tables. ColumnName contains the name of columns or column groups of the corresponding table in TableName. To avoid name conflicts in different databases, it is not required that the column names of a table be the same as the name used in the target database. If they are not the same, the content of RealName is the actual name used in the target database. If it is empty, the real name is the same as the column name in the directory/dictionary. The real name is always used to access data from the database server. The column name is also used as column headers for viewing. The column Description contains detail descriptions of the columns or column groups. The column ColumnNo specifies the position of the column or column group in the table.

DataType is used to specify the data type of the corresponding ColumnName. If ColumnName is the name of a column, the data type can be any possible DBMS data type such as TEXT, NUMBER, ENUM, . . . etc. If ColumnName is the name of a column group, the data type is COLUMN_GROUP. The information of the columns of a column group cannot be stored in the table Table_Columns, instead they are stored in the table Column_Values. The table Column_Values is used to store detail column information of column groups. The columns of this table are the same as the table Tables_Columns except that the first column ColumnGroup contains only names of column groups and sub-groups. This table is used to organize columns into a hierarchy of groups and sub-groups. It is also used to store column groups commonly used by different tables having the same column groups. The column ColumnName of this table contains column names or names of column subgroups. The columns PrimaryKey, Indexed, Format, DecimalPlaces, FieldSize, DefaultValues, Required, Validation, AutoIncrement contain information needed to create the database on the database server.

If the enumerated values of a column are organized as a value hierarchy, the data type of this column is VALUE_GROUP. The name of this column is the name of the value group. The information of value groups is stored in the table Enumerate_Values. This table is used to organize enumerated values into a hierarchy of groups and sub-groups. The definition of this table is shown in FIG. 8F. Value groups defined in this table can be used by multiple tables having the same set of enumerated values. If the enumerated values of a column are not organized as a hierarchy of values, the DataType of this column is ENUM. The enumerated values of an ENUM typed column can be stored in the column EnumerateValues of the table where the column name is defined. This information is stored as a sequence of enumerated values delimited by commas. The column ValueGroup of the table Enumerate_Values contains names of value groups or subgroups. The column ValueSubgroup contains names of value subgroups or individual enumerated value. If ValueSubgroup is empty, it indicates that this value group has no more subgroups. The list of enumerated values of this group can be stored in the column EnumerateValues of this table. If detail description of each enumerated value is needed, each enumerated value can be stored in both column ValueSubgroup and EnumerateValues, and its detail descriptions stored in the column Description.

The Command Buttons Add, Delete, Insert and Replace on these browser pages are used to input or update information in these internal database tables. The other Command Buttons on these pages are used for selection, aggregation and computation of data from the table for viewing. The same mechanisms are used for the input and viewing of information in all other database tables in the directory/dictionary.

Creation of New Databases and Tables

After the descriptions of a database and the corresponding tables are created in the directory/dictionary, it can be physically created on the database server using the DBMS product specified in DbProductUsed for that database. Standard database management system interface such as ODBC can be used if the target database server supports the standard interface. If the database server does not support standard DBMS interfaces, then the DBMS's client library is used to communicate with the target database server. DBMS product specific drivers may be used to take advantage of product specific features and to resolve differences in the database query languages. The Build Command on the Command Menu bar instructs the Search/Computing Engine to construct and send requests to the database server to create databases and tables. The Build Command prompts the user for the name of a database group or sub-group. With the name entered, it builds the SQL requests using the information in the directory/dictionary.

Starting from the name of database group or sub-group, Search/Computing transverse the directory/dictionary until it encounters the name of a database. After a SQL request to create the database is constructed, it'll then transverse the database sub-structure to obtain the definitions of each table in the database. Since relational database has no concept of groups and subgroups of columns and column values, these structure hierarchies must be reduced to linear lists of columns and enumerated values before standard SQL request can be constructed. For example, the following SQL request can be generated to create the Customer_Table shown in FIG. 5B on a database server. Since AddressInfo in FIG. 5B is a group of columns, it is substituted by its member columns Address, City, Regions, PostalCode and Country as follows:
CREATE TABLE customer_table (
    CustomerID char(5),
    CompanyName char(40),
    ContactName char(30),
    Title char(30),
    Address char(60),
    City char(60),
    Regions char(15),
    PostalCode char(10),
    Country char(15),
    PhoneNumber char(24),
    Fax char(24),
    PRIMARY KEY (CustomerID)
);

Upon completion of transversal of the database substructure and all the SQL requests constructed, these request are send to the database server to create the databases and their tables. After the database server processes these requests, a set of empty tables is created for each database in the database group. If the databases or tables already exist in the target database server, Search/Computing will only obtain the database and table definitions from the database server and check for consistency with the information in its directory/dictionary.

Entering Data into a Database Table

Data can be input into the tables after they are created in the target database server. To enter new data, the user must first go to the browser page showing the table column descriptions. This can be done by using either the top-down or bottom-up search, or by simply entering the name of the table in the Select Command prompt. The Add Command Button is then used to add new data into the table. For example, if the Add Command in FIG. 5B is applied, it produces a page showing all the columns in the Customer_Table with corresponding input fields for entering data as shown in FIG. 9A.

The Replace Command can be used to update existing data or input new data in a table. The Replace Command produces a page showing a spreadsheet like table format with rows and columns. The column headings are the column names. The Include and Exclude Command Buttons can be used to select existing data from the database server for updates. If no data is retrieved, an empty table is displayed. If the table has a large number of columns, the Include and Exclude Command Buttons can be used to limit the input data to specific columns. For example, if the columns CustomerID, CompanyName, ContactName, Title and PhoneNumber of the table Customer_Table are included, the Replace Command produces a browser page as shown in FIG. 9B.

Selection of Data for Viewing and Update

Small tables can be viewed by simply clicking the Report Command Button without any selection of columns and rows. In this situation, the whole table is retrieved from the target database server with the SQL query:
SELECT*FROM table_name;

If the table has a large number of columns and/or rows, columns and rows can be selected to reduce the size of the resulting view. To select specific columns for viewing or update, one must first display the browser page showing the table column descriptions as mentioned before. On the left size of the browser page under the heading 'Select', the Check Boxes are used to specify the columns to be selected for viewing or update. After the boxes are checked, the Include/Exclude Command is used to include/exclude the columns checked. A column group is indicated by a series of x's on the line showing the name of the group. Checking the box of a column group include/exclude all the columns in the group. In FIG. 9C, it shows that the columns CustomerID, CompanyName, ContactName, PhoneNumber and the column group AddressInfo are selected. To select specific columns in a column group instead of the whole group, the user can open the column group by clicking the column name on the page. For example, if the column group AddressInfo is clicked, a browser page showing the columns of AddressInfo will be displayed. Specific columns in the group are selected by checking the boxes as before. Column inclusions and exclusions are accumulative so that columns on different pages can be selected and viewed together. In FIG. 9C, the Option Menus in the column under the heading 'Position' are used to specify the position of the columns in the resulting view. It provides a list of position numbers to be selected. If no position is specified, the position of the selected column in the resulting view is based on the order of the columns on the selecting page and the order of inclusions/exclusions request. If no column is included or excluded, it is assumed that all the columns in the table are selected. One may also check the box of 'All' for all columns. The hyperlink 'All' in the page refers to all columns on the page.

The Include and Exclude Commands are also used to select specific rows of the table to be viewed and updated. On the right hand side of the browser page showing table columns, there are two Option Menus for selecting the lower limit and upper limit of a range of values. In order to show the option values in the Option Menus, Search/Computing automatically obtain this information from the database server with the following SQL query:
SELECT DISTINCT column_name FROM table_name ORDER BY column_name;

Before the distinct values is retrieved, the number of option values can be determined by:
SELECT COUNT(DISTINCT column_name) FROM table_name;

If the resulting list of distinct values is longer than a configurable value, the lower and upper limits of the value range can be retrieved from the database server with the SQL query:
SELECT MIN(column_name),MAX(column_name) FROM table_name;

In this situation, the maximum and minimum are shown in the 'Low Limit' and 'High Limit' Option Menus instead. To change the 'Low Limit' and 'High Limit' Option Menus to Input Fields, the user can click the hyperlink 'All' under the heading 'Column Name'. The lower and upper limits of a value range can then be entered into these two Input Fields instead of selecting them from the Option Menus. If one wants to enter individual values instead of a value range, a list of column values separated by commas can be entered into either one of these two Input Fields. Combinations of individual values and ranges are possible. A range is given by separating the low and high limit with a colon. For example, the following input:
    3, 7, 11:25,33
selects the values 3, 7, 11 to 25 and 33. In this example, the condition of the SQL query is expressed as:
column_name=3 OR column_name=7 OR (column_name<=11 AND column_name>=25) OR column_name=33

If the values of an ENUM typed column is organized as a hierarchy of enumerated values, one can inspect the enumerated values by clicking the hyperlink of the column name to produce the browser page as shown in FIG. 6B and FIG. 6C. The Check Box next to each enumerated value or value group on the browser page is used to select the enumerated value or a group of enumerated values. Inclusion and exclusions of enumerated values are accumulative, the user can transverse the enumerated value pages to select all the values wanted.

If the column values are selected from more than one column, the rows which satisfy conditions of both columns, will be retrieved. This logic is used by default. In FIG. 9C, for example, if CustomerID from 'ALFKI' to 'BSBEV' and Title='Owner' are included. The SQL query generated in this example is:
SELECT CustomerID, CompanyName, ContactName, Address, City, Regions, PostalCode, Country, PhoneNumber FROM Customer_Table WHERE (CustomerID>='ALFKI' AND CustomerID<='BSBEV') AND Title='Owner';

If the default logic is not desired, logical conditions can be input by entering the logical expression into the Input Field under the heading 'Formula' of 'Row'. For example, if the SQL conditions of the selections above are intended to be a union instead, the conditions can be entered as:
(CustomerID>='ALFKI' AND CustomerID<='BSBEV') OR Title='Owner'

Arbitrary complicated logical conditions can be specified and included by this method. The results generated for viewing may be ordered according to the column values retrieved. More than one level of ordering is possible, the Option Menus under the heading 'Order by' on the table column description page are used to specify the order level of the columns. For example, if one wants to view the report ordered by CustomerID and Title, the order level of CustomerID is 1 and the order level of Title is 2. The Check Box descending sort order is used to specify the descending/ascending sort order in the resulting view.

These methods of row and column selections are also used by the Total, Average, Maximum, Minimum, Count, Replace, Delete Commands and for formula definitions with the Define and Compute Commands. Search/Computing creates and sends the SQL requests to the database server automatically according to the instructions given after the Report or Execute Command Button is clicked. Creation of the SQL queries and interaction with the database server are transparent to the users.

Aggregations of Rows and Columns

The Command Buttons Total, Average, Count, Maximum and Minimum on the table column description page are used to perform aggregations of columns and rows. After a set of columns is included using the Include Command, one can apply any one of the aggregation commands to the same set of columns included. The result is a view with all the columns included together with one aggregated column showing the result of the aggregation. Multiple sets of column inclusion and aggregation are possible. The columns included and the aggregated columns are positioned according to the group number. The column group number is entered into the Input field above the heading 'Group' when the columns are selected. If no group number is given, it is set equal to the increment of the last group number. Within a set of inclusion, columns are positioned based on their order on the table column description page. The user can use the Option Menus under the heading 'Position' to override the default positions. A name can be given to each set of aggregated columns included. This name is used as the column heading in the resulting view. It is entered into the Input Field under the heading 'Column'. If no name is given, Search/Computing automatically generates a name using the command name and the names of the aggregated columns.

Similarly, rows can be included and aggregated the same as columns. After a set of rows is included, any one of the Command Buttons Total, Average, Count, Maximum and Minimum can be used to make aggregation requests for the same set of rows. The resulting view is the set of rows included together with one aggregated row showing the results of the aggregation. Unlike the replication of calculations in a spreadsheet where the user must specify to which columns the calculation is replicated, row aggregation is applied automatically to all the columns in the resulting view. Aggregations are suppressed automatically if the data of the column is non-numeric. In some situations, the aggregation is not meaningful even if the data is numeric. For example, aggregation of EmployeeID numbers has no meaning. In these situations, the Check Box of the columns can be used to indicate which column should be aggregated. Multiple sets of row inclusion and aggregation are possible. The rows included for display or aggregated can be assigned a group number. The group number is entered into the Input Field under the heading 'Group' when the rows are selected. If no group number is given, it is set to the increment of the last group number. All the rows belong to the same aggregation group are aggregated into one row in the resulting view. The group number also determines the relative positions of the selected and aggregated rows in the resulting view.

Within a group consists of multiple rows included, rows can be position based on one or more 'Order by' column Option Menu selections. The number in the 'Order by' Option Menu specifies the order level of the column. A name can be given to each set of rows aggregated. This name is used as the row label of the aggregated row in the resulting view. It is entered into the Input Field under the heading 'Row'. If no name is given, a row label is generated automatically using the command name. FIG. 9D is an example showing selections of the columns 2004_Housing, 2003_Housing and all the rows of the state of Alabama for display and aggregation from a Housing_Forcast table. In order to display both the details and the totals, both the Include and the Total Command must be clicked in that order. To create multiple sets of column and row inclusions and aggregations, the Include and aggregation Commands can be applied to other columns and rows before the Report Command is invoked. An example of the results is shown in FIG. 10A. At the intersections of aggregated columns and rows, the results are produced as intended.

The SQL queries are not sent to the database server until the Report Command Button is clicked. Search/Computing automatically generates a sequence of SQL queries to retrieve the results from the data base server. The creation of these SQL queries and the interactions with the database server are transparent to the user. The final result is sent to the browser as a HTML page. The following SQL queries are generated to retrieve the data from the SQL server to produce the results in FIG. 10A:
SELECT MSA, 2004_Housing, 2003_Housing, (2004_Housing+2003_Housing), 2002_Housing, 2001_Housing, (2002_Housing+2001_Housing) FROM Housing_Forecast WHERE State='Alabama'
SELECT SUM(2004_Housing), SUM(2003_Housing), SUM(2004_Housing+2003_Housing), SUM(2002_Housing), SUM(2001_Housing), SUM(2002_Housing+2001_Housing) FROM Housing_Forecast WHERE State='Alabama'
SELECT MSA, 2004_Housing, 2003_Housing, (2004_Housing+2003_Housing), 2002_Housing, 2001_Housing, (2002_Housing+2001_Housing) FROM Housing_Forecast WHERE State='Arizona'
SELECT SUM(2004_Housing), SUM(2003_Housing), SUM(2004_Housing+2003_Housing), SUM(2002_Housing), SUM(2001_Housing), SUM(2002_Housing+ 2001_Housing) FROM Housing_Forecast WHERE State='Arizona'

Aggregation of columns and rows can be done without the details of columns and rows if only aggregation Commands are applied without first applying the Include Command. The result is a condensed summary of row and column aggregations without the details. An example is shown in FIG. 10B.

Inclusion and aggregation requests can be grouped by one or more columns. An example of aggregations group by the column State is shown in FIG. 10C. The Option Menus under the 'Group by' heading is used to specify GROUP BY requests. If more than one GROUP BY column is involved, the number in the 'Group by' Option menu specifies the order of the GROUP BY columns. To produce the results, Search/Computing first retrieves all value combinations of the GROUP BY columns according to the selection criteria. If no selection criterion is given, all possible value combinations of the GROUP BY columns in the table are retrieved. These column value combinations are then used to build the SQL queries to access the results. For example, if aggregations are grouped by column1, column2 and column3 with no selection criterion. Search/Computing first obtains all the column value combinations with the SQL query:
SELECT DISTINCT column1,column2,column3 from table_name ORDER BY column1, column2,column3;

The result of this query is a list of all value combinations of these three columns exists in the database. A SQL query is then send to the database server for each combination of this list to access the inclusion and/or aggregation results. Search/Computing automatically generates the row labels for the aggregated rows using the Command Name and the values of the corresponding GROUP BY columns.

Definition and Replication of Column and Row_Formulas for Speedsheet Like Computations To combine the concepts of spreadsheet and database into one concept, Search/Computing allows column and row formulas be defined. In spreadsheets, cell addresses are referenced by column and row positions, and formulas are defined in terms of cell addresses. After a formula is defined for a cell, it can be replicated or copied to other cells. Search/Computing uses a different method to define formulas. A formula can be defined either as a column formula or row formula. The formula defined is referenced by the name of the formula.

Column formulas are defined in terms of column names of a table, names of previously defined column formula, constants, data elements from the same table or other tables, names of aggregations and functions. By default, a column formula is automatically replicated to all the rows included. The Input Fields under the headings 'Column', 'Position', 'Formula' in the table column description browser page are used to input a column formula. The name of the formula, which is also used as the column heading in the resulting view, is entered into the Input Field under the heading 'Column'. The position of the defined column is entered into the Input Field under the heading 'Position'. The default position is the last column if this field is empty. The body of the formula is entered into the Input Field under the heading 'Formula'. If the name of the formula is the same as one of the columns names in the table, the result of the computations will be stored in the database and displayed in the resulting view. Otherwise, it'll only be displayed in the resulting view. The column formula is submitted by clicking the Define Command Button. After a column is defined by formula or by aggregation, the name of the defined column will be displayed together with the table columns in the table column description page. The following example defines a set of column formulas for a stock investments application.

A Stock Investments table is shown in FIG. 11A. The columns names of this table are: Stock, Symbol, DateAcquired, Shares, InitialPrice and CurrentPrice. The following column formulas are defined:
InitialCost=Shares*InitialPrice
CurrentValue=Shares*CurrentPrice
Gain_Loss=Shares*CurrentPrice-Shares*InitialPrice
Percent_Gain=100*(CurrentPrice-InitialPrice)/InitialPrice The definition of the column formula Percent_Gain is shown in FIG. 11A. The formulas above are all defined in terms of column names in the table and constants. They can also be defined in term of previously defined formulas. For example, Gain_Loss and Percent_Gain can also be defined as:
Gain_Loss=CurrentValue-InitialCost
Percent_Gain=100*Gain_Loss/InitialCost Similarly, row formulas are defined in terms of row labels, constants, and data elements from the same or other tables, functions, aggregations and names of previously defined row formulas. Row labels are character string values of columns with column type TEXT or ENUM. The formula defined can be referenced by the name of the formula. The Input Fields under the headings 'Row', 'Position', 'Formula' in the table column description page is used to input a row formula. The name of the formula, which is also used as the row label in the resulting view, is entered into the Input Field under the heading 'Row'. Search/Computing uses the concept of Groups to determine the position of a set of rows in the resulting view. A Group may be a set of rows included. For example: all the rows with InitialPrice <=50.00 and Shares >=300 can all be included in Group 1. A Group may also be the computed result of aggregations and formulas. For example a row named Total, which is the sum of all the rows in Group 1 can be defined as Group 2. In this case, Group 2 has only one row in the resulting view. The result of a row formula also has only one row.

The Group number is entered into the Input Field under the heading 'Group'. If no Group number is given, the default Group number is the automatic increment of the last Group number. The body of the formula is entered into the Input Field under the heading 'Formula'. By default, a row formula of a Group is automatically replicated to all the included and defined columns. In some situations, different row formulas may be applied to different columns of the Group. Hence, Search/Computing allows more than one row formulas be defined in the same Group. If more than one row formula is defined in the Group, the Check Box of the column names and defined column names (i.e. names of column formulas or aggregation defined) in the table column description page is used to indicate to which column the formula is applied (i.e. replicated). Since the name of a row formula is displayed as the row label, multiple row formulas of the same Group must use the same name and Group number. If the name of the row formula coincides with an existing row in the database table, the data of the included columns with no row formula applied will be retrieved and overlay with the columns computed in the resulting view. The row formula is submitted by clicking the Compute Command Button.

In the Stock Investments example, a set of rows are included and a number of row formulas are defined. In this example, the InitialPrice, Shares, DateAcquired, and CurrentPrice for individual stocks are stored in the database. The column formulas defined previously can be computed with the data in the database. The first Group is created with the Include command. A set of stock Symbol is included to display information of the individual stock and the computed columns:

The second Group consists of four row formulas. These formulas use a Search/Computing built-in function named SUM to compute the total of a column. The parameter of the function SUM may be a column name or the name of a column formula defined (e.g. Gain_Loss). This Group computes the total of InitialCost, CurrentValue, Gain_Loss and Percent_Gain. Note that Percent_Gain cannot be calculated by simply adding the Percent_Gain of each individual stock. Therefore, one cannot use the aggregation command Total to produce the result. Instead, the following row formula is used. If a set of rows is selected when the formula is submitted, the SUM function computes the column total of the rows selected. Otherwise it computes the column total of all the rows. The method used to specify a set of values for the formula is the same as the aggregation Commands.
Total=SUM(Gain_Loss)/SUM(InitialCost)*100

The definition of this formula is shown in FIG. 11B. To indicate that this row formula is only applicable to the column Percent_Gain, the Check Box of Percent_Gain on the table column description page is checked. To indicate the stocks to which the SUM function is applied, the stock Symbol included in Group 1 must be specified before the Compute Command is submitted.
Similarly, the other row formulas of this Group are defined as:
Total=SUM(CurrentValue)
Total=SUM(InitialCost)
Total=SUM(Gain_Loss)

As mentioned, row formulas defined for the same Group must use the same formula name and Group number. The formula name of all the formulas in Group 2 is Total. Each one of these formulas is applied to the corresponding column.

In this example, the averages for Shares, InitialPrice, InitialCost, CurrentPrice, CurrentValue, Gain_Lost are also calculated. The built-in function AVG can be used to calculate the averages. But since the average of Percent_Gain is not needed in the resulting view of this example, it is easier to use the Average Command to produce the results of the third Group. To indicate the columns and rows to be averaged, the Check Boxes of Shares, InitialPrice, CurrentPrice, CurrentValue, InitialCost, Gain_Loss are checked and the stock Symbols specified before the Average Command is submitted.

It is meaningful to apply Maximum and Minimum to the computed values of Percent_Gain. These two Commands can be used to produce the results of the fourth and fifth Groups the same as Average.

After all the inclusions, aggregation and formulas are completed, the Report Command Button is clicked to get the results. Search/Computing automatically generates all the SQL queries and processes the results to produce the report as shown in FIG. 11C To do different computations for different sets of rows, one can use a different Group number in the row formula definition for each computation. By checking the Check Box of the column names and the defined column names in the table column description page, these row formulas may be applied to the same or different sets of columns. The Group number also determines the relative display positions of the computation in the resulting view. For example, Group number 1 can be assigned to the computation of SUM(InitialPrice) for the stock symbols range from 'AAA' to 'MMM' in the first Compute Command and Group number 2 assigned to the computation of AVG(InitialPrice) for the stock symbols range from 'NNN' to 'ZZZ' in the second Compute Command. If the Check Box of the Column InitialPrice is checked when the Compute Command is submitted, the resulting view will show the computed result of Group 1 above Group 2 in the column InitialPrice after the Report Command is invoked Naming Scheme of Column and Row Formulas There are many advantages in using names instead of column and row positions to define formulas. Not only it is much easier to read and write, the formulas are not affected when the row and column positions are changed. Names can be used to reference:
1. A table column
2. A row of a table
3. A data item (i.e. cell) of a table
4. A column formula
5. A row formula
6. A column aggregation
7. A row aggregation
8. A function Naming of items 4, 5, 6, 7 is simply the name used to define the formula or the aggregation. The name must be unique if it is to be referenced by other formulas. A name used to reference item 3 may compose of up to four parts expressed as:
table.column1.column2.row This is used to reference a specific data item (cell) of a table. For example, the InitialPrice of the stock AAA can be referenced as:
Stock_Investments.InitialPrice.Symbol.AAA To access this data item, the SQL query is:
SELECT InitialPrice FROM Stock_Investments WHERE Symbol='AAA'

If column1 and column2 are column names of the table for which the formulas are defined, then the name of the table can be omitted. In other words, it is the default table name. In the example, the InitialPrice of the stock AAA can be referenced as:
InitialPrice.Symbol.AAA To reference a data item of another table, all four parts of the name must be given unless that table has only one row. In this situation, only the table name and the column name are needed. An example of this is a parameter table shown in FIG. 12E created to store parameters commonly used by many formulas. Only one row exists in this table, it contains the values of the parameters. In FIG. 12E, the unit cost parameter in the table Parameters can be referenced as Parameters.Unit_cost.

To reference a row of a table in a row formula, a name consists of up to three parts is needed. It is expressed as table.column.row. For example, the entire row of the stock AAA in the Stock_Investments table can be referenced as:
Stock_Investments.Symbol.AAA The SQL query used to access the row is:
SELECT*from Stock_Investments WHERE Symbol='AAA';

If the table name is the same as the table for which the formula is defined, it is the default table name and hence can be omitted. The naming of rows can further be simplified by using a default column name. When a row formula is defined, the name of a column can be entered into the 'Column' input field. If this field is empty, the default column is the first column of the table. A row of the table can be referenced by the value of the default column. In the example above, the entire row of the stock AAA can simply be referenced as AAA.

To reference a column in a column or row formula, a name consists of two parts is needed. It is expressed as table.column. For example, the entire column of the stock symbols in the Stock Investments table can be referenced as:

Stock_Investments.InitialPrice

The SQL query used to access the column is:
SELECT InitialPrice from Stock_Investments;

If the table name is the same as the table for which the formula is defined, it is the default table name and hence can be omitted. In this example, the column can simply be referenced as InitialPrice.

If a name in a row formula is consists of two parts, the first part may be the name of a row formula previously defined instead of a table name. In this situation, the name is used to reference a cell in the row computed. The second part of this name may be the name of a column or a column previously defined. A formula may be defined to calculate the value of a cell based on the value of adjacent cells or cells in relative locations. If this calculation is needed for multiple cells, it would be tedious to define a different formula for each computation because each cell has a unique name. The following naming method provides relative addressing so that the formula can be applied to multiple cells without changes. A cell on the left or right side can be referenced as:
Row.#+n
Row.#−n
Where n is an integer and 'Row' is the name of a row or a previously defined row formula. To reference a cell above or below in a column, the name can be expressed as:
Column.#RowNo.+n
Column.#RowNo.−n Where 'RowNo' is the name of a column containing the row number and 'Column' is the column of interest. In this situation, the naming method requires the table to have a column that contains the row number.

The following example Seven Years Financial Plan illustrates references of adjacent cells in a formula. This example uses two tables, the Plan_Table (FIG. 12A) for viewing the seven years plan and a parameter table (FIG. 12E) for storing the parameters used in the plan formulas. This example is a typical spreadsheet application. Only one row of data, the maintenance cost, is stored in the Plan_Table. All other data elements are computed.

The first row, Revenue, is computed with two formulas. The first data element, Revenue of Year2003, is computed using the first formulas below:
Revenue=Parameters.Sales_2002*(Parameters.Unit_cost/(1−Parameters.Margin))
Revenue=Revenue.#−1*(1+Parameters.Sales_growth)*(1−Parameters.Price_decrease)

The table Parameters contains all the parameters used in the formulas. This table has only one row. The Revenues from Year2004 to Year2009 are computed using the Revenue of the previous year as shown above. In this formula, Revenue.#−1 refers to the adjacent revenue value last computed. The definitions of these two formulas for two different sets of columns are shown in FIG. 12A and FIG. 12B. Note that these two formulas have a different set of column boxes checked and they have the same Group number.

The row Cost_of_goods is computed using the results in the row Revenue and the parameter Margin in the Parameters table as follows:
Cost_of_goods=Revenue*(1−Parameters.Margin)

The remaining rows, Margin, Advertising, Maintenance, Rent, Salaries, Supplies, Total_Expense, Income_Before_Tax, Income_Tax and Net_Income are computed as:
Margin=Revenue−Cost_of_goods
Advertising=1000+0.15*Revenue
Maintenance=RowName.Maintenance The computed rows are referenced by its name. The Maintenance data is stored in the Plan_Table. RowName.Maintenance refers to the row Maintenance in the Plan_Table. If RowName is the default column, then it can simply be referenced as Maintenance. Rents are also calculated based on previous year's rent except the first year's rent of $1800000.
Rent=1800000
Rent=Rent.#−1+0.1*Rent.#−1
Salaries=0.18*Revenue
Supplies=0.015*Revenue
Total_Expense=Advertising+Maintenance+Rent+Salaries+Supplies
Income_Before_Tax=Margin−Total_Expense Total_Expense and Income_Before_Tax are computed using the results of previous results.
Income_Tax=IF(Income_Before_Tax<=0, 0, 0.4*Income_Before_Tax)

Income_Tax is computed using the function IF. This function has three parameters. The first parameter is a conditional expression. The second parameter is the result of the function if the condition is TRUE. The third parameter is the result if the condition is FALSE. The formula above specifies that if the Income_Before_Tax is less than or equal to 0, the Income_tax is 0. Otherwise, the Income_Tax equals 0.4 times Income_Before_Tax.
Net_Income=Income_Before_Tax−Income_Tax This example has no column formulas. The computations will be performed and a report as shown in FIG. 12C will be generated after the Report Command Button is clicked.

Using Functions in Row and Column Formulas

Search/Computing functions are similar to functions in programming languages or SQL. A function takes zero or more parameters separated by commas and return a value. The parameter may be an expression in terms of row or column names, constants or data elements from the same or other tables and results of other functions. The data type and interpretation of the parameters are straightly function dependent. In the example Seven Years Financial Plan, the use of the IF function in a row formula is illustrated.

The following Payroll example illustrates the use of the IF functions to define column formulas. The columns of the Payroll Table shown in FIG. 12D are Employee_Name (employee name), Rate (paid rate), Hours (hours worked), Dependents (number of dependents) and YTD_Social_sec (year-to-date social security paid). The following two column formulas are defined to calculate gross pay and social security tax.
Gross_Pay=IF (Hours<=40, Rate*Hours, Rate*(Hours+0.5*(Hours−40)))

Gross_Pay is calculated using the Search/Computing function IF. This function states that if the number of hours worked is 40 or less, the gross pay equals the pay rate times the number of hours worked. Otherwise, it is paid time and a half. The social security tax is also calculated using the function IF as follows:
Social_Security=IF
(Tax_Table.Social_Sec_Tax*Gross_Pay+
YTD_Social_Sec>=Tax_Table.Max_Social_Sec,
Tax_Table.Max_Social_Sec−YTD_Social_Sec,
Tax_Table.Social_Sec_Tax*Gross_Pay)

The social security tax rate (Social_Sec_Tax) and the maximum social security (Max_Social_Sec) are stored in Tax_Table, which is another table in the database. To make this example simple, Tax_Table has only row. If the tax rate is gross pay and tax year dependent, then Tax_Table would have multiple rows and a lookup function is needed to access the tax rate and other information in the tax table using gross pay and tax year as input parameters. The remaining column formulas for medicare tax, federal tax, state tax and net pay are defined as:

Medicare=Tax_Table.Medicare_Tax*Gross_Pay
Federal_Tax=IF(Gross_Pay−Dependents*38.46>=0, Tax_Table.Federal_Tax*(Gross_Pay−Dependents*38.46), 0)
State_Tax=Tax_Table.State_Tax*Gross_Pay
Net_Pay=Gross_Pay−(Social_Security+Medicare+Federal_Tax+State_Tax)

Commonly used functions, IF, SUM, AVG, MAX, MIN, COUNT, LOOKUP, . . . etc., are provided. Even though the functions SUM and AVG can be used to calculate the total and average for each column using the column name as input parameter, it is better to use aggregations in this situation. Otherwise, a row formula must be defined for each column.

Accessing Information from Multiple Tables

Search/Computing combines the power of formula replications in spreadsheet and relational operations in relational database. Information from different tables can be integrated into the view of a single table if these tables have common columns. This is known as a 'JOIN' operation in terms of relational database system. If columns and rows are selected from more than one table in the directory, Search/Computing will check if these tables have common columns when the Report Command is submitted. If columns have the same column names or real names, these columns will be displayed as shown in FIG. 13A. The user can then check the boxes of the columns that will be used in the JOIN operation of the SQL query. If no box is checked, each table will be displayed independently with no JOIN. The default JOIN operation is EQUI-JOIN since it is the most common JOIN operation. Other JOIN operations (!=, >=, <=, >, <) can be selected from the 'Join' Option Menu.

All relational database management systems support relational JOINs if the tables belong to the same database. Some relational database management systems support distributed database management. In a distributed database, tables in the same database may not be stored on the same machine or processor. They may exist in different locations on the Internet. Some database management system even allows JOIN operations between tables from different databases. Interoperable database operations between different database management systems are very rare but not impossible since the SQL query language is intended to be a standard. Search/Computing exploits existing capabilities of the database management systems as much as possible. A local relational database management server is employed in the Search/Computing application server for storing the directory/dictionary tables. There is another use of this local database server. In the situation where JOIN operations are not possible using the target DBMS capabilities, Search/Computing can copy the tables or portions or the tables from the target databases into its local database. The JOIN operations can then be done locally to produce the results.

To produce a view with information from multiple tables, one can transverse the directory/dictionary, making column and row selections along the way. If a row formula or an aggregation is defined for one table, they are replicated automatically to all other tables to be JOINed. Formula and aggregation may also be replicated to other table columns on a selective basis. The following example illustrates ProductSales reporting using tables in the directory/dictionary. Information from four tables, Order_Table, Product_Table, Order_Detail_Table, and Customer_Table are combined into a single table view. The Order_Table contains an OrderID and a CustomerID that can be used to reference order details and customer information in the Order_Detail_Table and the Customer_Table. The Order_Detail_Table contains a ProductID, which can be used to reference information in the Product_Table. This example combines the ProductName in the Product_Table, the OrderID, EmployeeID, OrderDate, OrderYear from the Order_Table, the amount of sales from the Order_Detail_Table and the CompanyName of the Customer from the CustomerTable for all the orders placed in 1997.

The report is Group by CustomerID, with the order information ordered by ProductName within each group. For each group, the total and median sales amount in 1997 is also computed. To produce this report, ProductName is first included from the Product_Table with 'Order by' option value set to 1. The columns OrderID, EmployeeID, OrderDate and OrderYear are selected and included from the Order_Table. The Low Limit of OrderYear is set to 1997. The High Limit of OrderYear can be either 1997 or empty. In the Order_Detail_Table, a column formula ProductSales is defined as:

ProductSales=(UnitPrice*Quantity*(1.0−Discount)/100.0)*100

Two row formulas are defined to calculate Total and Median ProductSales:

Total=SUM(ProductSales)
Median=(MIN(ProductSales)+MAX(ProductSales))/2

SUM, MIN and MAX are Search/Computing built-in functions. After the column ProductSales is defined, a new column ProductSales is added to the table column description page of the Order_Detail_Table when this page is displayed. To indicate these two row formulas are applicable to the ProductSales column only, the box of ProductSales is checked as shown in FIG. 13B when the formula is defined.

From the Customer_Table, the CustomerID and the CompanyName are selected. The range of CustomerID is included with the 'Group by' option set to 1. The report as shown in FIG. 14 is produced after clicking of the Report Command Button.

Review, Reset, Save and Restore Selections, Aggregations and Formulas

After formulas or aggregations are defined and selections are made, one can verify that they are correct with the Review Command. This command generates a summary of the selections, aggregations and formulas (i.e. the instructions) that have been made or defined so far. If more than one table is involved, Search/Computing displays a list of relevant tables from which one can selected for review. From the review summary, specific instructions (i.e. inclusions, aggregations and formulas) previously given can be removed with the Undo Command. Specific instructions in the review summary can be suppressed with the Hide Command. Hided instructions can be reinstated later with the Unhide Command. A review summary of the Order_Detail_Table instructions in the previous example is shown in FIG. 15. The instructions can be saved in the directory/dictionary with a name known as Instruction Set. This name can be used to restore this set of instructions later with the Restore Command. Save and Restore can be done any time after a set of instructions is made or changed. To make changes to an existing set of instructions, it may be easier to restore the Instruction Set previously saved than to try Undo specific instructions in the current instruction set. The Reset Command is used to start over again. Before one can start a new set of instructions, use the Reset Command to undo all outstanding instructions. The Set Command is used to add new instruction to the existing instructions without any changes.

The Make, Print and Execute Commands

There is a limit on the size of HTML files that can be transferred between the browser and the Search/Computing server. The default limit of Search/Computing is 2000 lines. This limit can be changed. The output can be directed to a file or a printer with the Print Command if it is too long. The output may also be directed to a table in the directory/dictionary with the Make Command. After a target table and the column names of the target table are selected, the Make command specifies the association of the output columns with the selected columns of the target table. The association is one-to-one, hence the output and the target must have the same number of columns. Data from different tables can be merged to a target table by doing multiple Make command requests. For example, the address and phone numbers of the Customer_Table, Employee_Table, Shipper_Table, and Supplier_Table can all be merged into an Address Table.

The Execute command is used to initiate the execution of multiple sets of instructions saved. This command prompt the user for the names of one or more Instruction Sets previously saved. The Instruction Sets are executed in the order these names were input.

Alternative Implementations, Screen Display and Naming Schemes

With the information in the Search/Computing directory/dictionary, it is actually possible to deduce if a formula defined is a column or row formula or if the formula is meaningful without explicit indication of column or row. It is also possible to deduce the meaning of a name given sufficient components. Hence, it is possible to have an implementation with a less rigid naming rule and explicit definitions of column and row formulas. These alternative implementations are considered to fall within the scope of this patent. However, it is believed that explicit indication of column and row formulas and a rigid naming scheme can help users to think clearly in defining the formulas.

The particular embodiments disclosed above are illustrative only, as the invention may be modified and practiced in different but equivalent manners apparent to those skilled in the art having the benefit of the teachings. Furthermore, no limitations are intended to the details of construction or design shown. It is therefore evident that the particular embodiments disclosed above may be altered or modified and all such variations are considered within the scope and spirit of the invention.

What is claimed is:

1. A method for creating extensible computer applications with a user interface, by cascading sets of retrieval, computation and update requirement specifications to facilitate repetition, decision and execution control logics, without user input of natural, procedural and programming language and without generating any source codes and executable computers programs; said extensible computer application is composed of unlimited levels of components and sub-components; each component is consists of one or more sets of requirement specifications previously created; newly created components consists of multiple existing components are useable to create higher level components; said method for building applications with no limitation in size and complexity; said method provides database product independent Web based access of databases on the Internet preforming the following steps:
   a. creating a database dictionary/directory in the form of a two way hierarchical structure with a keyword index for describing existing or new databases tables, columns, and data values;
   b. creating new databases on the Internet;
   c. keyword scan by the user in said dictionary to identify available keywords; d. searching said directory by keywords to establish entry points to the directory;
   e. browsing said directory upward or downward by the user from the said entry points to identify information of interest step by step;
   f. creating retrieval and computation requirement specifications by the user during the directory browsing process;
   g. creating update and deletion requirement specifications for existing information and addition of new information during the directory browsing process;
   h. saving, restoring said requirement specifications by name and submitting said requirement specifications to be executed by the computing engine;
   i. cascading previously saved requirement specifications as components and sub-components to create a newly named requirement specification which can itself be saved as a component or executed;
   j. specification of said retrieval/update requirements, repetition and decision control logic from said databases during the directory browsing comprise user: selecting one or more tables from said databases; selecting one or more columns and/or column group from said tables; selecting of one or more data values and/or data value groups and/or data value ranges from said columns; selecting common columns from said selected tables, and criterion for the purpose of integrating multiple tables into a single table; said criterion must be based on the selecting of equal, not equal, greater, smaller, greater or equal, smaller or equal values of the selected common columns; selecting sort columns and/or sort order; selecting group-by columns and/or group-by order from said selected tables;
   k. specification of said computation requirements, decision and execution control logic from said databases during the directory browsing comprise user: selecting one or more tables from said databases; selecting one or more columns and/or column groups from said tables; selecting one or more data values and/or data value ranges and/or data value groups from said tables; selecting group-by columns and/or group-by order; specifying column aggregation operations; specifying row aggregation operations; creating column algebraic and/or logical expressions known as column formulas in said tables; creating row algebraic and/or logical expressions known as row formulas in said tables;
   l. operands of said row and column formulas can be expressed symbolically in terms of names or name combinations in said dictionary/directory, operand can also be constants and functions provided by the Web application server; said operand can refer to specific data element, specific row or column in the same or different tables; naming scheme of said operands with specific rules provide a method to address data element, row and column of said tables: said operand can also be the name of a row or column formula defined previously; said row formulas, logical expressions and/or aggregations are automatically applied to all the columns of the row unless restricted by other specification of computation requirements; said column formulas, logical expressions and/or aggregations are automatically applied to all the rows of the column unless restricted by other specification of computation requirements; said sets of retrieval/update and computation requirement specifications can be saved and restored with a given name; said operand can also be the name of a set of requirement specifications saved previously, in which case the requirement specifications will be executed upon submission; said formulas and logical expressions can also be expressed in terms of built-in functions provided by the computing engine with said operands as arguments of said functions to facilitate execution control logics;

m. said naming scheme used to name operands in row and column formulas are defined as follows: data elements in any table can be named in the form of X.A.B.C.D; said name addresses the data items of column B in the rows of table A in database X with the value of column C equals D; if said name represents more than one data items, it will be used as an operand of an aggregate or built-in function; if X is omitted in the name, X is defaulted to be the database currently selected: if A is omitted, A is defaulted to be the table currently selected; if B is omitted in the name, expressed as A.C.D of database X, said name references all the rows in table A with the value of column C equal D; if C and D are omitted in the name, expressed as A.B of database X, said name references all the data items in column B of table A; if A, C and D are omitted in the name of an operand, said name references all the data items of column B of the table currently selected; if A, B and C are omitted in the name of an operand, said name references all the rows with data value of the first column of the table currently selected equals D; all names of column and row formulas defined within the same set of requirement specification are unique; all names of requirement specifications saved are unique.

2. The method of claim 1, wherein said method is implemented as a Web application server, comprising at least one Search and Computing engine with a Web browser user interface to perform said steps.

3. The method of claim 1, comprising:
  a1. said Web application server receiving input from end-users and returning responses to end-users to perform said steps;
  b1. communicating between the Web browsers and the Web application server uses Markup Language commonly supported by Web browsers;
  c1. said Web application server interacting with one or more database servers to access information in the databases on the Internet; communicating between the Web application server and the database server uses query language commonly supported by database systems;
  d1. said application server creating all the logic required to automatically generate one or more queries to the database servers according to said requirement specifications (i.e. requirements) and processing the responses of the queries from the database servers;
  e1. said application server creating all the logics required to automatically perform computations according to requirement specifications, to generate Markup Language Web server responses to the Web browsers, and to update the database without user input of database query language, programming or program script language, natural language like queries and without generating source codes and computer programs and without using any Web browser plugin.

4. The method of claim 2, wherein said Web application server, Web browsers and database servers reside on one or more computers on the Internet.

5. The method of claim 1, wherein said dictionary/directory structure provides viewing of:
  a2. the directory, showing the relationships between databases, tables, columns and data values wherein databases, tables, columns and data values can all be organized by multiple levels of subject categories and subcategories, each node in said hierarchy can have more than one parent nodes and more than one child nodes;
  b2. a detail description of each database and database group in said directory, of each table and each table group in said databases, of each column and each column group in said tables, of each data value and each value group in said columns with enumerated data type;
  c2. an URL, database product used and a second name of each database and table;
  d2. a data type, format, value range, a second name and all other necessary information of each table column for creating and accessing said database tables;
  e2. an index of significant keywords, comprising at least one dictionary, extracted from the names and descriptions of databases, database groups, tables, table groups, columns, column groups, enumerated data values, enumerated value groups, text data values and contents of document type data wherein each keyword index entry in said dictionary points to one or more nodes in the directory; said keyword index is an integral part of the dictionary/directory.

6. The method of claim 1, wherein said dictionary/directory facilities searching by user input of keywords, the results of the search comprising all the paths leading from the relevant nodes in said hierarchical structure, which may be data values or data value groups, columns or column groups, tables or table groups, databases or database groups, to the root of said directory.

7. The method of claim 1, wherein said directory browsing can be started from any node on said search paths by the user to transverse upward or downward within the directory one step at a time, in order to identify information of interest.

8. The method of claim 1, wherein said directory browsing by the user automatically presents a detail description of the object of interest to the user at each step; the system is completely self-documented.

9. The method of claim 1, wherein said sets of retrieval, update and computation requirement specifications saved previously can be restored, reviewed, changed, and saved again with the same or a different name and submitted for execution.

10. The method of claim 1, wherein sets of requirement specifications saved previously can be restored and executed automatically in a given order or saved with a name to facilitate cascading execution control logics.

11. The method of claim 1, wherein subsets of said steps can be implemented as a Web application server with a Web browser user interface to perform said steps.

12. The method of claim 1, said dictionary/directory can also be used to maintain relationships between any objects to facilitate directory searching and directory browsing of these objects by keywords.

13. The method of claim 1, said steps or subset of said steps can be implemented using user interfaces and server technologies other than Web Browser and Web application server.

14. The method of claim 2, wherein said Web Browser user interface comprising:
  a3. using Hyperlinks to facilitate upward/downward directory transversal;
  b3. using Check Box controls to facilitate selecting columns/column groups and data value/data value groups;

c3. using Select Option controls with Pull-Down menus and Text Input field for selecting data values and data values range;

d3. using Check Box control for selecting common columns and Select Option Pull-Down menu for selecting criterion, comprising at least one of equal, not equal, greater, smaller, greater or equal, smaller or equal, to facilitate integrating multiple tables into a single table;

e3. using the Include and Exclude Button controls to facilitate decision and repetition control logics;

f3. using the Total, Average, Count, Maximum and Minimum Button controls to facilitate execution of aggregation control logics;

g3. using the Define, Compute Button controls with Text Input fields for defining row and column formulas and/or logical expressions to facilitate repetitive computation, execution and decision control logics; h3. using the Make Button control to facilitate repetitive update control logics;

i3. using the Save, Restore, Review and Update Button controls with Text Input fields and Hyperlinks to facilitate creating new and modifying existing requirement specifications;

j3. using the Add, Replace and Delete Button controls with Text Input fields for adding new data or updating existing data in said databases;

k3. using the New, Build Button controls with Hyperlinks and Text Input fields for adding or modifying information in the Dictionary/Directory;

l3. using the Execute and Save Button controls with Text Input field and Hyperlinks for cascading existing requirement specifications as components of a newly named requirement specification to facilitate execution control logics;

m3. using the Execute, Submit and Report Buttons with Text Input field and Hyperlinks to facilitate invocation of one or more requirement specification sets.

\* \* \* \* \*